United States Patent
Hayashi et al.

(10) Patent No.: US 9,712,717 B2
(45) Date of Patent: Jul. 18, 2017

(54) IMAGE PROCESSING APPARATUS, REGION DETECTION METHOD AND COMPUTER-READABLE, NON-TRANSITORY MEDIUM

(71) Applicant: PFU LIMITED, Kahoku-shi, Ishikawa (JP)

(72) Inventors: Ryo Hayashi, Kahoku (JP); Kiyoto Kosaka, Kahoku (JP); Masayoshi Hayashi, Kahoku (JP)

(73) Assignee: PFU Limited, Kahoku-shi, Ishikawa (JP)

( * ) Notice: Subject to any disclaimer, the term of this patent is extended or adjusted under 35 U.S.C. 154(b) by 78 days.

(21) Appl. No.: 14/831,596

(22) Filed: Aug. 20, 2015

(65) Prior Publication Data

US 2016/0286080 A1  Sep. 29, 2016

(30) Foreign Application Priority Data

Mar. 20, 2015 (JP) .................................. 2015-058637

(51) Int. Cl.
*G06K 9/48* (2006.01)
*H04N 1/393* (2006.01)
(Continued)

(52) U.S. Cl.
CPC ......... *H04N 1/393* (2013.01); *G06K 9/00442* (2013.01); *G06K 9/3233* (2013.01);
(Continued)

(58) Field of Classification Search
CPC ............... H04N 1/393; H04N 1/00702; H04N 1/00748; H04N 1/6016; H04N 1/00737;
(Continued)

(56) References Cited

U.S. PATENT DOCUMENTS 6,781,720 B1 * 8/2004 Klassen ................ G06T 7/0083
358/1.9
7,835,573 B2 * 11/2010 Kang ..................... H04N 9/045
358/525

(Continued)

FOREIGN PATENT DOCUMENTS

JP  2007-88654 A  4/2007
JP  2007-134830 A  5/2007
(Continued)

OTHER PUBLICATIONS

Office action mailed Oct. 18, 2016 in corresponding JP Application No. 2015-058637 including Eng. translation, 7pp.
(Continued)

*Primary Examiner* — Sheela C Chawan
(74) *Attorney, Agent, or Firm* — Lewis Roca Rothgerber Christie LLP

(57) ABSTRACT

An image processing apparatus includes a presumed background region extractor for extracting a presumed background region presumed to include an image of a background from an input image, a threshold value determination module for determining a threshold value based on pixels in the presumed background region, an edge pixel extractor for using the threshold value to extract edge pixels from the input image, and a document region detector for detecting a document region from the edge pixels.

12 Claims, 23 Drawing Sheets

(51) Int. Cl.

| | | |
|---|---|---|
| *H04N 1/00* | (2006.01) | |
| *H04N 1/48* | (2006.01) | |
| *H04N 1/60* | (2006.01) | |
| *G06T 7/11* | (2017.01) | |
| *G06T 7/12* | (2017.01) | |
| *G06T 7/194* | (2017.01) | |
| *G06T 7/136* | (2017.01) | |
| *G06K 9/00* | (2006.01) | |
| *G06K 9/32* | (2006.01) | |

(52) U.S. Cl.
CPC .............. *G06T 7/11* (2017.01); *G06T 7/12* (2017.01); *G06T 7/136* (2017.01); *G06T 7/194* (2017.01); *H04N 1/00702* (2013.01); *H04N 1/00737* (2013.01); *H04N 1/00748* (2013.01); *H04N 1/00769* (2013.01); *H04N 1/48* (2013.01); *H04N 1/6016* (2013.01); *G06T 2207/10024* (2013.01); *G06T 2207/30176* (2013.01); *H04N 2201/0081* (2013.01)

(58) Field of Classification Search
CPC .............. H04N 1/48; H04N 1/00769; H04N 2201/0081; G66T 7/0083; G06T 7/0081; G06T 2207/20148; G06T 2207/30176; G06T 2207/20144; G06T 2207/10024; G06T 2207/30148; G06T 7/001
USPC ....... 382/100, 149, 167, 173, 181, 190, 199, 382/232, 237, 254, 276, 309; 358/1.9, 358/518, 515, 520
See application file for complete search history.

(56) References Cited

U.S. PATENT DOCUMENTS

| | | |
|---|---|---|
| 2007/0002154 A1 | 1/2007 | Kang et al. |
| 2007/0065037 A1 | 3/2007 | Honda et al. |
| 2007/0103735 A1* | 5/2007 | Ikeno ................ H04N 1/00681 358/449 |
| 2009/0273818 A1 | 11/2009 | Matsui |
| 2011/0164816 A1 | 7/2011 | Guo |
| 2013/0121595 A1 | 5/2013 | Kawatani et al. |
| 2014/0294303 A1 | 10/2014 | Kawatani et al. |

FOREIGN PATENT DOCUMENTS

| | | | |
|---|---|---|---|
| JP | 2008-147712 A | * | 6/2008 |
| JP | 2009-272676 A | | 11/2009 |
| JP | 2011-141622 A | | 7/2011 |
| JP | 2013-106160 A | | 5/2013 |
| JP | 2014-195148 A | | 10/2014 |

OTHER PUBLICATIONS

Office action mailed May 31, 2016 in corresponding JP Application No. 2015-058643 including Eng. translation, 13pp.
Office action mailed May 24, 2016 in corresponding JP Application No. 2015-058637 including Eng. translation, 19pp.
Office action dated Oct. 20, 2016 in related U.S. Appl. No. 14/831,547, 11pp.
Office action mailed May 31, 2016 in corresponding JP Application No. 2015-058643 including Eng. translation, 10pp.
Office action mailed May 24, 2016 in corresponding JP Application No. 2015-058637 including Eng. translation, 14pp.

\* cited by examiner

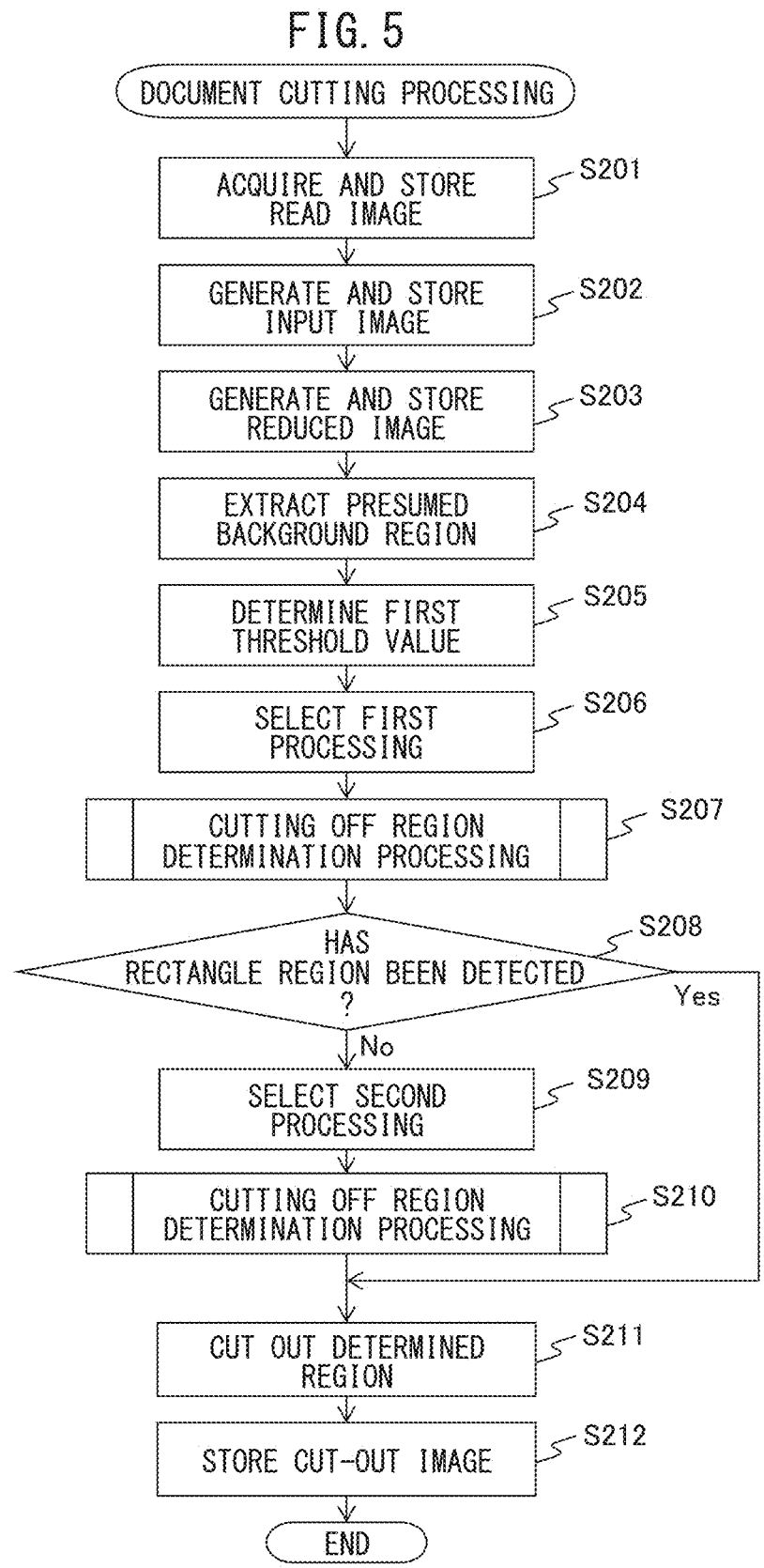

IMAGE PROCESSING APPARATUS, REGION DETECTION METHOD AND COMPUTER-READABLE, NON-TRANSITORY MEDIUM

CROSS-REFERENCE TO RELATED APPLICATIONS

This application is based upon and claims the benefit of priority of prior Japanese Patent Application No. 2015-58637, filed on Mar. 20, 2015, the entire contents of which are incorporated herein by reference.

TECHNICAL FIELD

Embodiments discussed in the present specification relate to detect a region from an image.

BACKGROUND

In order to read a document using a scanner or the like and store it as image data, it is necessary to accurately detect a document region in the read image. In a flatbed-type or automatic document feeding-type scanner in general, a document region can be easily distinguished from the other regions using a backing of a monotone color such as white, black, and the like. On the other hand, overhead scanners, which read a document placed on a desk or the like, are currently being used and the capability of accurately distinguishing between a pattern on a desk and a document is required of such scanners.

An image reading apparatus that obtains a document region from a read image has been disclosed. The image reading apparatus determines a method for cutting out a document region based on degree of coincidence between apex coordinates of a first rectangle region including all subjects and apex coordinates of a second rectangle region including all subjects determined as contents of the document among all of the subjects and having the smallest area (see Japanese Laid-open Patent Publication No. 2009-272676).

An image reading apparatus that generates reference data for detecting document edges using image data in a region in which a baking part appears across the full width of the region and obtains a difference between the reference data and image data to detect edges of a document has been disclosed. The image reading apparatus performs edge detection in given lines in the horizontal and vertical directions to detect the four sides of the document, thereby automatically recognizing the document image (see Japanese Laid-open Patent Publication No. 2007-88654).

An image processing apparatus that detects a boundary of a document in an input image has been disclosed. The image processing apparatus extracts edge pixels from an input image, extracts a plurality of straight lines from the edge pixels, extracts candidate rectangle regions from the extracted straight lines, and selects a rectangle region based on the number of edge pixels that are located within a predetermined distance from each side of each candidate rectangle region and the degree likelihood of being a corner of each possible corner (see Japanese Laid-open Patent Publication No. 2013-106160).

Furthermore, an image processing apparatus that determines a region in which an image of a document is cut out from a read image has been disclosed. The image processing apparatus detects a subject region in an input image and detects a rectangle region in the subject region. When the rectangle region matches the subject region, the image processing apparatus determines the rectangle region as the region to be cut out; when the rectangle region does not match the subject region, the image processing apparatus determines a region including the subject region as a region to be cut out (see Japanese Laid-open Patent Publication No. 2014-195148).

SUMMARY

There is the need for accurate detection of a region in which an image of a document is to be cut out from a read image to an image processing apparatus such as a scanner.

Accordingly, it is an object to provide an image processing apparatus and a region detection method that can accurately detect a region in which an image of a document is to be cut out from a read image and a computer-readable, non-transitory medium storing a computer program for causing a computer to implement such a region detection method.

According to an aspect of the apparatus, there is provided an image processing device. The image processing device includes a presumed background region extractor for extracting a presumed background region presumed to include an image of a background from an input image, a threshold value determination module for determining a threshold value based on pixels in the presumed background region, an edge pixel extractor for using the threshold value to extract edge pixels from the input image, and a document region detector for detecting a document region from the edge pixels.

According to an aspect of the method, there is provided a region detection method. The region detection method includes extracting a presumed background region presumed to include an image of a background from an input image, determining a threshold value based on pixels in the presumed background region, using the threshold value to extract edge pixels from the input image, and detecting, using a computer, a document region from the edge pixels.

According to an aspect of the computer-readable, non-transitory medium storing a computer program, the computer program causes a computer to execute a process, including extracting a presumed background region presumed to include an image of a background from an input image, determining a threshold value based on pixels in the presumed background region, using the threshold value to extract edge pixels from the input image, and detecting a document region from the edge pixels.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF THE DRAWINGS

FIG. 5 is a flowchart illustrating an operation of document cutting processing;

DESCRIPTION OF EMBODIMENTS

Hereinafter, an image processing apparatus, a region detection method and a computer program according to an embodiment, will be described with reference to the drawings. However, it should be noted that the technical scope of the invention is not limited to these embodiments, and extends to the inventions described in the claims and their equivalents.

Figure 1:
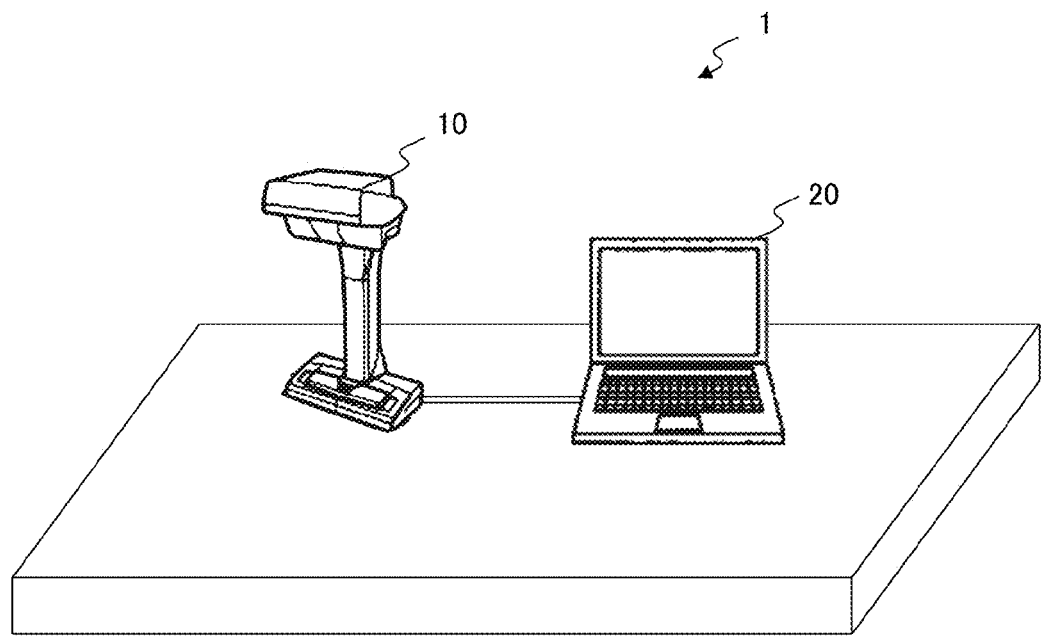
FIG. 1 is a diagram illustrating an image processing system 1 according to an embodiment.

FIG. 1 is a diagram illustrating an image processing system according to an embodiment. As illustrated in FIG. 1, the image processing system 1 includes an image reading apparatus 10 and an information processing apparatus 20. The image reading apparatus 10 may be an image scanner, a digital camera or the like, for example. This embodiment will be described with an example in which the image reading apparatus is an overhead scanner. The information processing apparatus 20 may be a personal computer or the like, for example, connected and used with the image reading apparatus 10.

Figure 2:
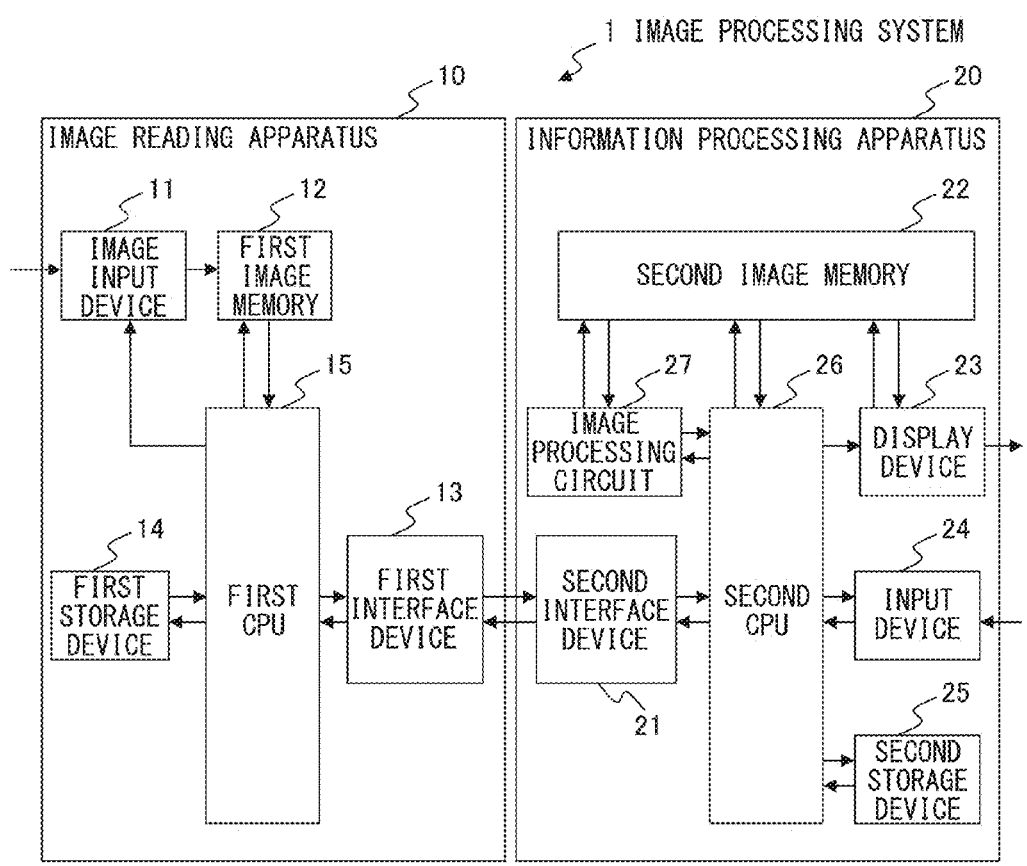
FIG. 2 is a diagram schematically illustrating a configuration of the image processing system 1 according to an embodiment.

FIG. 2 is a diagram schematically illustrating a configuration of the image processing system according to the embodiment. The image reading apparatus 10 includes an image input device 11, a first image memory 12, a first interface device 13, a first storage device 14, and a first CPU (Control Processing Unit) 15. Components of the image reading apparatus 10 will be described below.

The image input device 11 includes an image sensor imaging an image of a document or the like that is an imaging subject. The image sensor includes imaging elements and an optical system which forms an image of an imaging subject onto the imaging element. Each of the imaging elements outputs an analog value corresponding to each of RGB colors. The imaging elements are CCD (Charge Coupled Device) elements, CMOS (Complementary Metal Oxide Semiconductor) elements or the like arranged in a one-dimensional or two-dimensional array. The image input device 11 converts analog values output from the image sensor to digital values to generate pixel data and generates image data (hereinafter referred to as an RGB image) made up of the pieces of generated pixel data. The RGB image is color image data in which each piece of pixel data is made up of a 24-bit RGB value, for example, each of the RGB color components of which is represented by 8 bits.

The image input device 11 generates an RGB image or an image (hereinafter referred to as a read image) generated by converting the RBG values of the pixels in an RBG image into brightness values and color difference values (YUV values), and stores the read image in the first image memory 12. Note that the YUV values can be calculated in accordance with the following expressions, for example.

$$Y \text{ value} = 0.30 \times R \text{ value} + 0.59 \times G \text{ value} + 0.11 \times B \text{ value} \quad (1)$$

$$U \text{ value} = 0.17 \times R \text{ value} - 0.33 \times G \text{ value} + 0.50 \times B \text{ value} \quad (2)$$

$$V \text{ value} = 0.50 \times R \text{ value} - 0.42 \times G \text{ value} - 0.08 \times B \text{ value} \quad (3)$$

The first image memory 12 includes a storage device such as a nonvolatile semiconductor memory, a volatile semiconductor memory, a magnetic disk, or the like. The first image memory 12 is connected to the image input device 11 and stores a read image generated by the image input device 11.

The first interface device 13 includes an interface circuit compatible with a serial bus such as USB (Universal Serial Bus) and is electrically connected to the information processing apparatus 20 to transmit and receive image data and various kinds of information. A flash memory or the like may be connected to the first interface device 13, image data stored in the first image memory 12 may be temporarily stored in the flash memory and then copied to the information processing apparatus 20.

The first storage device 14 includes a memory device such as a RAM (Random Access Memory), a ROM (Read Only Memory), a fixed disk device such as a hard disk or a portable storage device such as a flexible disk, an optical disc, or the like. Computer programs, databases, tables and the like which are used for various kinds of processing by the image reading apparatus 10 are stored in the first storage device 14. Further, the first storage device 14 stores a computer program, a database, a table, and the like that are used for various processing of the image reading apparatus 10. The computer program may be installed on the storage device 104 from a computer-readable, non-transitory medium such as a compact disk read only memory (CD-ROM), a digital versatile disk read only memory (DVD-ROM), or the like by using a well-known setup program or the like.

The first CPU 15 is connected to and controls the image input device 11, the first image memory 12, the first interface device 13 and the first storage device 14. The first CPU 15 performs control of read image generation by the image input device 11, control of the first image memory 12, control of data transmission and reception to and from the information processing apparatus 20 through the first interface device 13, control of the first storage device 14, and other operations.

The information processing apparatus 20 includes a second interface device 21, a second image memory 22, a display device 23, an input device 24, a second storage device 25, a second CPU 26, and an image processing circuit 27. The components of the information processing apparatus 20 will be described below in detail.

The second interface device 21 includes an interface circuit similar to that of the first interface device 13 of the image reading apparatus 10 and interconnects the information processing apparatus 20 and the image reading apparatus 10.

The second image memory 22 includes a storage device similar to that of the first image memory 12 of the image reading apparatus 10. The second image memory 22 stores a read image received from the image reading apparatus 10 through the second interface device 21 and is connected to the image processing circuit 27 to store various processed images resulting from image processing of read images by the image processing circuit 27.

The display device 23 includes a display formed by a liquid-crystal display, an organic electroluminescence display or the like and an interface circuit which outputs image data to the display, and is connected to the second image memory 22 to display image data stored in the second image memory 22 on the display.

The input device 24 includes an input device such as a keyboard, a mouse or the like and an interface circuit acquiring signals from the input device and outputs a signal responsive to a user's operation to the second CPU 26.

The second storage device 25 includes a memory device, a fixed disk device, a portable storage device or the like that is similar to that of the first storage device 14 of the image reading apparatus 10. The second storage device 25 stores computer programs, databases, tables and the like used in various kinds of processing by the information processing apparatus 20. Further, the second storage device 25 stores a computer program, a database, a table, and the like that are used for various processing of the information processing apparatus 20. The computer program may be installed on the second storage device 25 from a computer-readable, non-transitory medium such as a CD-ROM, a DVD-ROM, or the like by using a well-known setup program or the like.

The second CPU 26 is connected to and controls the second interface device 21, the second image memory 22, the display device 23, the input device 24, the second storage device 25 and the image processing circuit 27. The second CPU 26 performs control of data transmission and reception with the image reading apparatus 10 through the second interface device 21, control of the second image memory 22, control of display of the display device 23, control of input of input device 24, control of the second storage device 25, control of image processing of the image processing circuit 27, and other operations.

The image processing circuit 27 is connected to the second image memory 22 and performs document cutting processing. The image processing circuit 27 is connected to the second CPU 26 and operates in accordance with a program stored in the second storage device 25 beforehand under the control of the second CPU 26. Note that the image processing circuit 27 may be formed by an independent integrated circuit, a microprocessor, firmware or the like.

Figure 3:
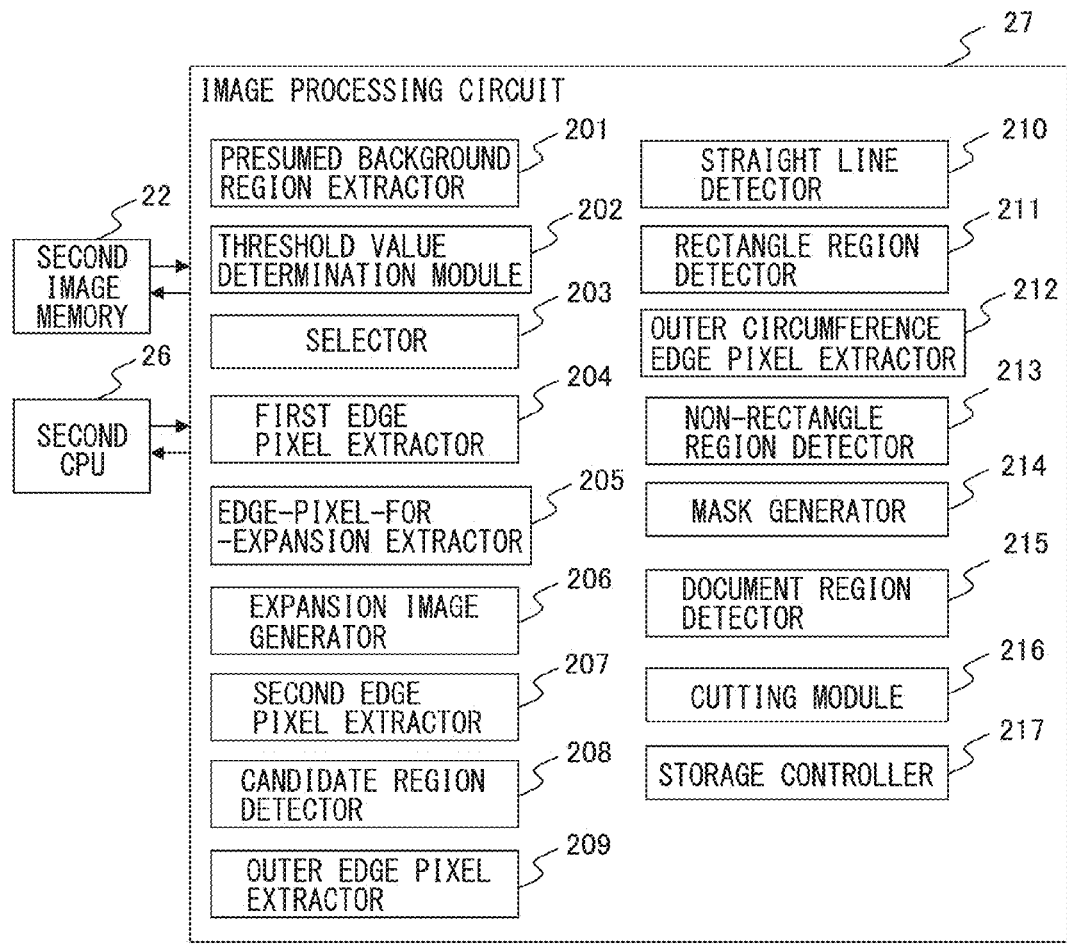
FIG. 3 is a diagram schematically illustrating a configuration of an image processing circuit 27.

FIG. 3 is a diagram schematically illustrating a configuration of the image processing circuit 27. As illustrated in FIG. 3, the image processing circuit 27 includes a presumed background region extractor 201, a threshold value determination module 202, a selector 203, a first edge pixel extractor 204, an edge-pixel-for-expansion extractor 205, an expansion image generator 206, a second edge pixel extractor 207, a candidate region detector 208, an outer edge pixel extractor 209, a straight line detector 210, a rectangle region detector 211, an outer circumference edge pixel extractor 212, a non-rectangle region detector 213, a mask generator 214, a document region detector 215, a cutting module 216 and a storage controller 217. Some of these components may be functional modules implemented by software or firmware running on a processor. Note that some of these components may be formed by independent integrated circuits, microprocessors or the like.

Figure 4:
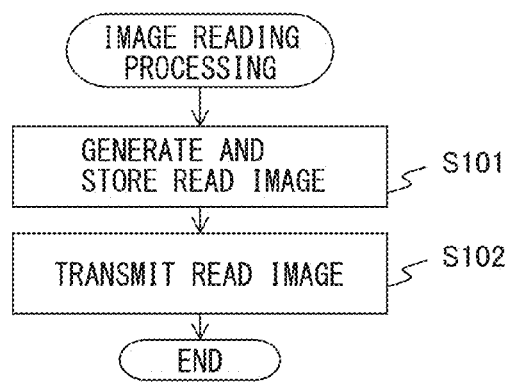
FIG. 4 is a flowchart illustrating an operation of image reading processing.

FIG. 4 is a flowchart illustrating an operation of image reading processing performed by the image reading apparatus 10. The operation of the image reading processing will be described below with reference to the flowchart in FIG. 4. Note that the flow of the operation described below is executed primarily by the first CPU 15 in cooperation with the components of the image reading apparatus 10 in accordance with a program stored in the first storage device 14 beforehand.

First, the image input device 11 images a document, which is an imaging subject, to generate a read image and stores the read image in the first image memory 12 (step S101).

Then the first CPU 15 transmits the read image stored in the first image memory 12 to the information processing apparatus 20 through the first interface device 13 (step S102), then ends the sequence of steps.

FIG. 5 is a flowchart illustrating an operation of document cutting processing performed by the information processing apparatus 20. The operation of the document cutting processing will be described below with reference to the flowchart illustrated in FIG. 5. Note that the flow of the operation described below is executed primarily by the second CPU 26 in cooperation with the components of the information processing apparatus 20 in accordance with a program stored in the second storage device 25 beforehand.

First, the second CPU 26 acquires a read image from the image reading apparatus 10 through the second interface device 21 and stores the read image in the second image memory 22 (step S201).

Then, the image processing circuit 27 retrieves the read image stored in the second image memory 22, decimates pixels in the read image in the horizontal and vertical directions to generate a first input image, and stores the first input image in the second image memory 22 (step S202). The first input image is an example of an input image.

In general, the processing speed of the information processing apparatus 20 significantly varies depending on the number of pixels of images being processed. Therefore the rate of pixel decimation is determined in accordance with the throughput of the second CPU 26 and other components and the processing speed required of the information processing apparatus 20. Note that when processing speed requirements are met without decimating pixels, the read image may be used as the first input image without decimation.

Figure 6A:
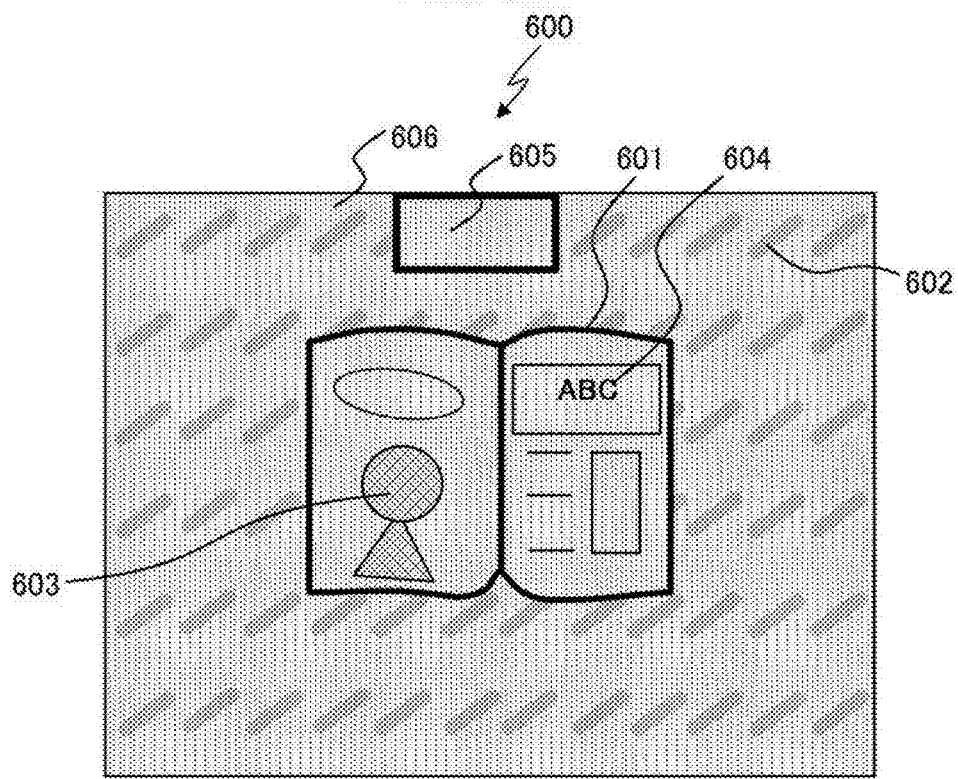
FIG. 6A is a schematic diagram illustrating an image in the document cutting processing.
Figure 6B:
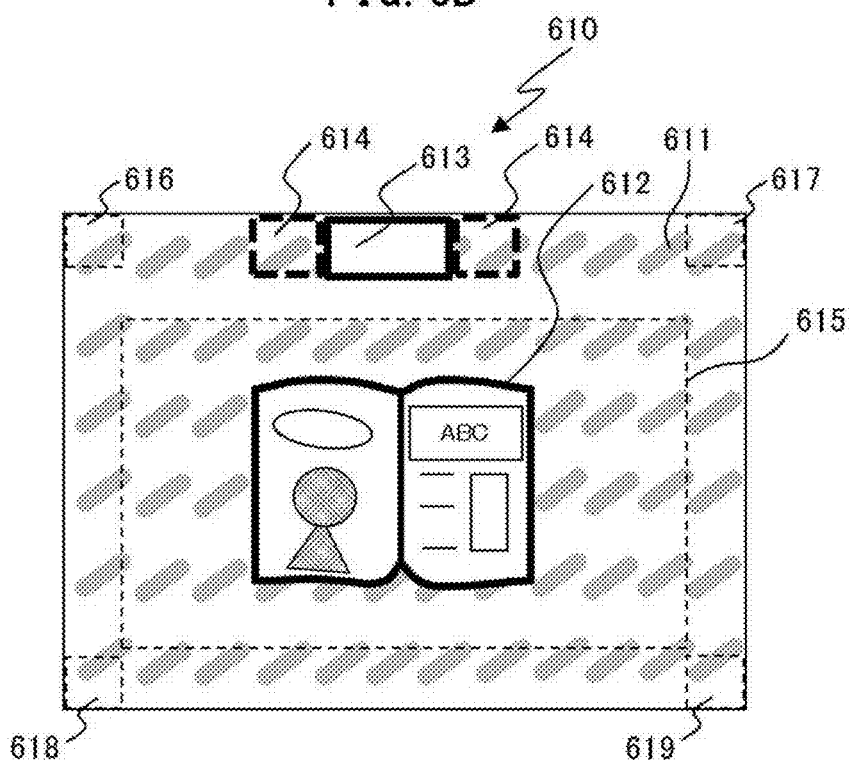
FIG. 6B is a schematic diagram illustrating an image in the document cutting processing.

FIGS. 6A to 6B are schematic diagrams illustrating images in the document cutting processing. The image 600 illustrated in FIG. 6A is an example of the first input image. The first input image 600 is an image acquired by imaging a document which is a book 601 placed on a desk having a pattern 602 such as a woodgrain pattern. The book 601 contains a shaded portion 603 and letters 604 and other elements. A portion 605 of the base of the housing of the image reading apparatus 10 that has captured the first input image 600 is appearing in the first input image 600. Furthermore, random noise 606 generated by the influence of the imaging elements and the optical system of the image input device 11 of the image reading apparatus 10 is appearing in the first input image 600.

Then, the image processing circuit 27 further decimates pixels in the first input image in the horizontal and vertical directions to generate a second input image and stores the second input image in the second image memory 22 (step S203). The second input image is another example of the input image.

The image 610 illustrated in FIG. 6B is an example of the second input image. The rate of decimation for generating the second input image 610 from the first input image 600 is predetermined such that random noise 606 is removed whereas the shaded portion 603 and letters 604 and the like in the document are not removed.

Note that the image processing circuit 27 may apply a smoothing filter to the first input image, instead of generating the second input image, to remove random noise 606. Alternatively, the first edge pixel extractor 204 may further apply a smoothing filter to the second input image.

Then the presumed background region extractor 201 extracts a presumed background region presumed to include an image of a background from the second input image (step S204).

It is unlikely that a user of an overhead scanner will place a document near the base of the scanner and it is likely that a background will appear near the base of the scanner in the image. The presumed background region extractor 201 therefore extracts a region near a portion of the image reading apparatus 10 in the second input image as a background region. The near region is set within a predetermined range (for example within a distance equivalent to 50 mm) from the portion of the image reading apparatus 10 in the second input image, for example. Note that when a portion of the image reading apparatus 10 appears in the second input image, it is further unlikely that the document appears on the same horizontal line as the portion appearing in the second input image. Accordingly, the presumed background region extractor 201 may extract a region 614 within a predetermined range from a portion 613 of the image reading apparatus 10 in the horizontal direction as a presumed background region as illustrated in FIG. 6B.

Note that the presumed background region extractor 201 may extract a region outside a predetermined document reading range 615 in the second input image as a presumed background region. This enables the presumed background region to be extracted when no portion of the image reading apparatus 10 is in the second input image. Note that it is likely that the hands or the like of the user will appear in a region in the imaging range of the image reading apparatus 10 that is opposite to the location where the image reading apparatus 10 is placed, i.e. a lower region of the second input image. Therefore, the presumed background region extractor 201 may exclude the lower region of the document reading range 615 in the region outside the document reading range 615 from the presumed background region.

When a region outside the document reading range 615 is extracted as a presumed background region, the user may be instructed to place a mat indicating the document reading range on the desk on which the document is placed before scanning the document, so that the user can identify the document reading range. Note that the image reading apparatus 10 may emit light indicating the document reading range from a light emitter (not depicted) onto the desk on which the document is placed to allow the user to identify the document reading range. This can ensure that a region in which the pattern on the desk appears can be extracted as a presumed background region.

Furthermore, the presumed background region extractor 201 may extract a presumed background region based on four regions 616-619 located at the four corners of the second input image. In that case, the presumed background region extractor 201 calculates a normalized cross-correlation function for each pairs among the four regions 616-619. Based on the calculated normalized cross-correlation functions, the presumed background region extractor 201 determines whether or not a predetermined number (for example three) of regions equal to or greater than two among the four regions 616-619 are similar to each other. When any of the regions are similar to each other, the presumed background region extractor 201 extracts the regions similar to each other as presumed background regions. This can remove regions in which the pattern on the desk does not appear from the presumed background region.

Then the threshold value determination module 202 determines a first threshold value for extracting edge pixels, based on the pixels in the presumed background region extracted by the presumed background region extractor 201 (step S205). The threshold value determination module 202 calculates the absolute value of a difference between pixel values of pixels neighboring each pixel in the horizontal direction in the presumed background region (hereinafter the difference is referred to as a neighboring difference value) and the neighboring difference value in the vertical direction and generates a histogram of the calculated neighboring difference values.

Figure 7:
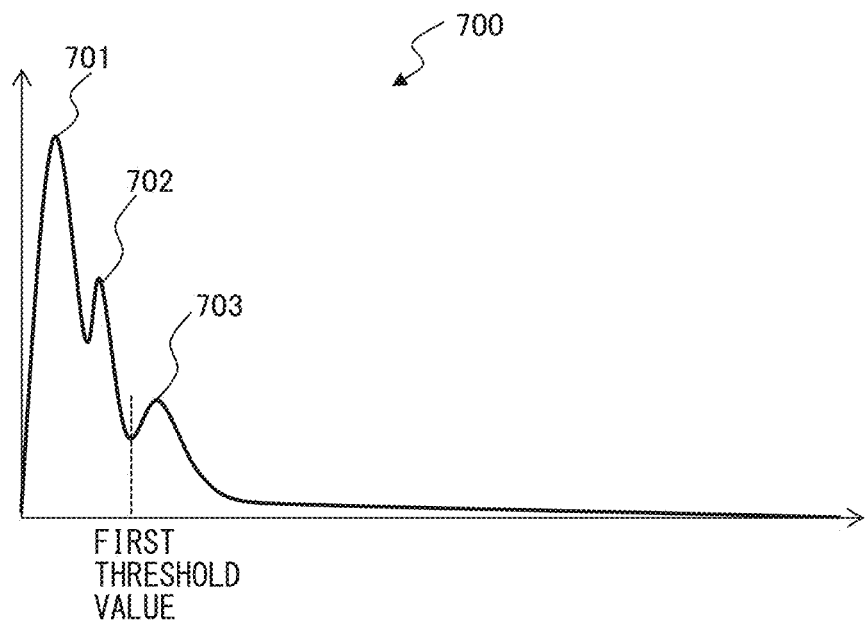
FIG. 7 illustrates an example of a histogram of neighboring difference values.

FIG. 7 is a diagram illustrating an example of a neighboring difference value histogram. The horizontal axis of FIG. 7 represents neighboring difference values of the pixels in a presumed background region and the vertical axis represents distribution value. In the histogram 700 of FIG. 7, the distribution value has peaks around a neighboring difference value 701 between pixels having substantially the same pixel values, around a neighboring difference value 702 from pixels at an edge of a pattern on the desk, and around a neighboring difference value 703 between other pixels.

The threshold value determination module 202 uses the Otsu's binarization method, for example, to determine the first threshold value such that the first threshold value is between the neighboring difference value 702 from pixels located at an edge of the pattern on the desk and the neighboring difference value 703 from other pixels. Binarizing neighboring difference values of the pixels in the second input image using the first threshold value can inhibit an edge of the pattern on the desk from being extracted as edge pixels.

Note that the threshold value determination module 202 may remove a predetermined top percentage (for example 1%) of the neighboring difference values in the neighboring difference value histogram before calculating the first threshold value. This enables appropriate calculation of the first threshold value when an unwanted object such as a hand of the user or an object other than a document is in the presumed background region.

Furthermore, the presumed background region extractor 201 may extract a plurality of presumed background regions, the threshold value determination module 202 may calculate a threshold value for each of the plurality of extracted presumed background regions, and the median of the calculated threshold values may be used as the first threshold value. For example, the presumed background region extractor 201 may extract an upper region, a left-hand region, and a right-hand region in a region outside the document reading range 615 as presumed background regions. This enables appropriate calculation of the first threshold value when a document or an unwanted object is at any of the upper edge, left edge or right edge of the second input image, because the influence of that portion is removed.

Then the selector 203 selects, as a method for detecting a document region, first processing that detects a document region based on first edge pixels detected using the first threshold value (step S206). Then the components of the image processing circuit 27 perform cutting off region determination processing in accordance with the first processing (step S207). In the cutting off region determination processing, the components of the image processing circuit 27 determine a cutting off region in which an image of the document is to be cut out from the first input image. When a non-rectangle region is detected as a document region in the cutting off region determination processing, the mask generator 214 generates a mask for separating the background from a cut-out image, based on the detected non-rectangle region. Details of the cutting off region determination processing will be described later.

The selector 203 then determines whether or not a rectangle region has been detected in the cutting off region determination processing based on the first processing (step S208).

Figure 8:
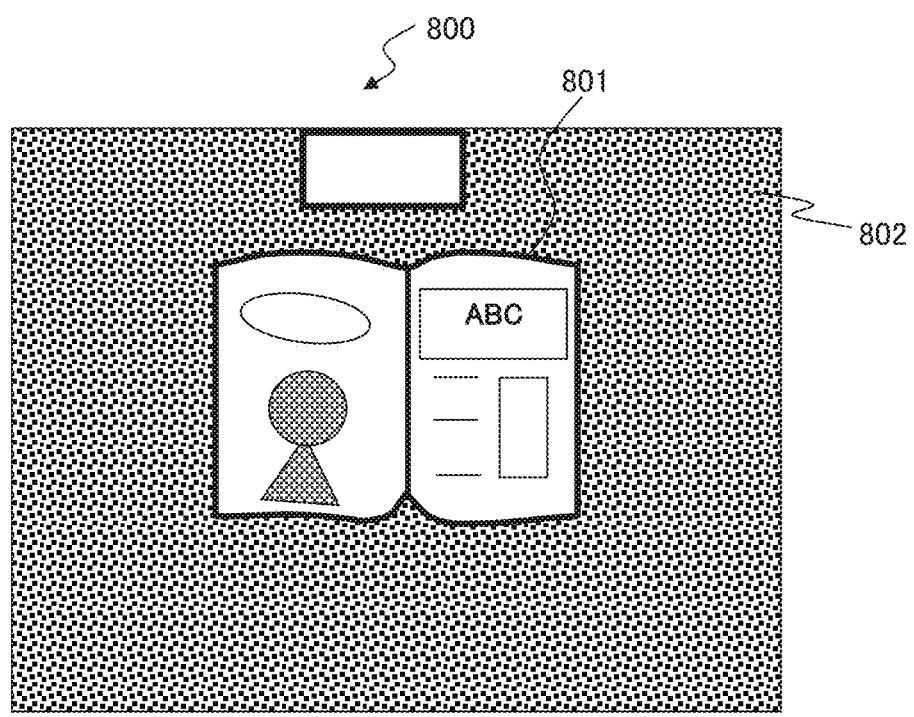
FIG. 8 is a schematic diagram illustrating another example of a first input image.

FIG. 8 is a schematic diagram illustrating another example of the first input image. In the first input image 800 illustrated in FIG. 8, a desk on which a book 601 is placed is made of marble or the like and has a pattern 802 having a high contrast, and the difference between neighboring difference values from pixels at the edges of the desk pattern and neighboring difference values from pixels at the edges of a document is small. Accordingly, when the first threshold value is used to binarize the neighboring difference values of the pixels in a second input image, there is a possibility that the edges of the document cannot be extracted as edge pixels.

When no rectangle region has been detected in the cutting off region determination processing based on the first processing, the selector 203 selects, as a method for detecting the document region, second processing that detects a document region based on second edge pixels detected from an expansion image, which will be described later (step S209). Then the components of the image processing circuit 27 perform the cutting off region determination processing in accordance with the second processing (step S210). In other words, when a rectangle region has been detected in the cutting off region detection processing based on the first processing, the selector 203 selects to use first edge pixels in order to detect the document region; when no rectangle region has been detected, the selector 203 selects to use second edge pixels.

Then the cutting module 216 cuts out the cutting off region determined in the cutting off region determination processing from the first input image (step S211). Note that when a non-rectangle region has been detected as a document region in the cutting off region determination processing, the cutting module 216 uses a mask generated by the mask generator 214 to separate the background from the cut-out image, thereby extracting a separated image that represents the document alone.

Then the storage controller 217 stores the cut-out image and the separated image in the second image memory 22 (step S212) and ends the sequence of steps. The storage controller 217 stores the cut-out image in a storage medium that persistently stores images, such as a nonvolatile semiconductor memory, in the second image memory 22 and stores the separated image in a storage medium that temporarily stores images, such as a volatile semiconductor memory. Note that the storage controller 217 may store the cut-out image in a hard disk or the like of the second storage device 25 and store the separated image in a RAM. The image stored in the second image memory 22 or the second storage device 25 is displayed on the display device 23 in response to a request from a user using the input device 24.

Furthermore, the storage controller 217 stores the cut-out image as a file and stores the separated image in a clipboard, for example, to make the separated image available to a given application. This allows the user to use the separated image simply by executing a paste command in document editor software, image editor software, spreadsheet software or the like, thereby improving the convenience to the user.

Note that the storage controller 217 may store an image (and a separated image) cut out when a non-rectangle region has been detected in a file format different from that of an image cut out when a rectangle region has been found. For example, when a rectangle region has been detected, the storage controller 217 may store the cut-out image in the JPEG (Joint Photographic Experts Group) format. On the other hand, when a non-rectangle region has been detected, the storage controller 217 may store the cut-out image in the transparent PNG (Portable Network Graphics) format. Thus, the information processing apparatus 20 can store an image in a format that is suitable for the shape of the image to improve the convenience to the user.

Figure 9:
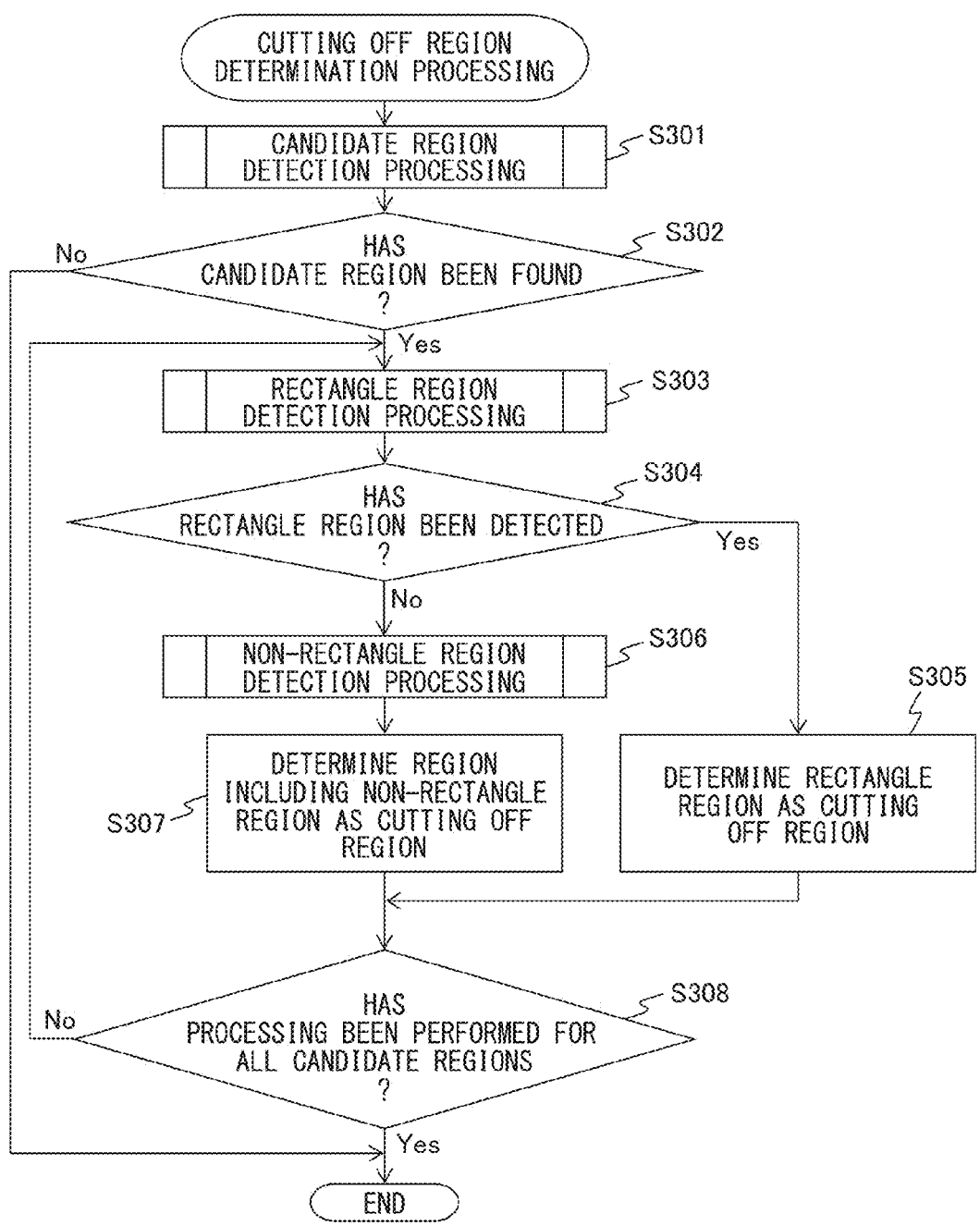
FIG. 9 is a flowchart illustrating an exemplary operation of cutting off region determination processing.

FIG. 9 is a flowchart illustrating an exemplary operation of the cutting off region detection processing. The operation flow illustrated in FIG. 9 is executed at steps S207 and S210 of the flowchart in FIG. 5.

First, the components of the image processing circuit 27 perform candidate region detection processing (step S301). In the candidate region detection processing, the first edge pixel extractor 204 or the second edge pixel extractor 207 extracts edge pixels and the candidate region detector 208 detects a candidate region enclosed by connected edge pixels among the extracted edge pixels. Details of the candidate region detection processing will be described later.

Then the candidate region detector 208 determines whether or not a candidate region has been detected in the candidate region detection processing (step S302). When no candidate region has been detected, the candidate region detector 208 does not perform further processing and ends the sequence of steps; on the other hand, when a candidate region has been detected, the processing proceeds to step S303. Processing at steps S303 through S308 is performed for each extracted candidate region.

Then the components of the image processing circuit 27 perform rectangle region detection processing for the candidate region (step S303). In the rectangle region detection processing, the first edge pixel extractor 204 or the second edge pixel detector 207 extracts edge pixels and the outer edge pixel extractor 209 extracts outer edge pixels located at the outer side among the edge pixels. Furthermore, the straight line detector 210 detects a plurality of straight lines from the outer edge pixels and the rectangle region detector 211 detects a rectangle region consisting of four straight lines where two pairs of the detected plurality of straight lines intersect at substantially right angles. Details of the rectangle region detection processing will be described later.

Then the document region detector 215 determines whether or not a rectangle region has been detected by the rectangle region detector 211 in the rectangle region detection processing (step S304). When a rectangle region has been detected by the rectangle region detector 211, the first document region detector 215 determines the detected rectangle region as the document region, i.e. a cutting off region in which an image of the document is to be cut out from the first input image (step S305).

On the other hand, when no rectangle region has been detected by the rectangle region detector 211, the components of the image processing circuit 27 perform non-rectangle region detection processing for the candidate region (step S306). In the non-rectangle region detection processing, the first edge pixel extractor 204 or the second edge pixel extractor 207 extracts edge pixels and the outer circumference edge pixel extractor 212 extracts outer circumference edge pixels that form the outer circumference of connected edge pixels among the extracted edge pixels. Furthermore, the non-rectangle region detector 213 detects a non-rectangle region surrounded by the outer circumference edge pixels. Details of the non-rectangle region detection processing will be described later.

Then the document region detector 215 determines a region including the non-rectangle region detected in the non-rectangle region detection processing as a document region, i.e. a cutting off region in which an image of the document is to be cut out from the first input image (step S307). The document region detector 215 determines the circumscribed rectangle region of the detected non-rectangle region as a cutting off region. Note that the document region detector 215 may determine the detected non-rectangle region itself as a cutting off region.

In this way, the document region detector 215 detects a document region from the first edge pixels or the second edge pixels.

Then the image processing circuit 27 determines whether or not the processing has been performed for all of the candidate regions (step S308). When there is a candidate region for which the processing has not been performed, the image processing circuit 27 returns to step S303 and repeats step S303 through step S308; when the processing has been performed for all of the candidate regions, the image processing circuit 27 ends the sequence of the steps.

Figure 10:
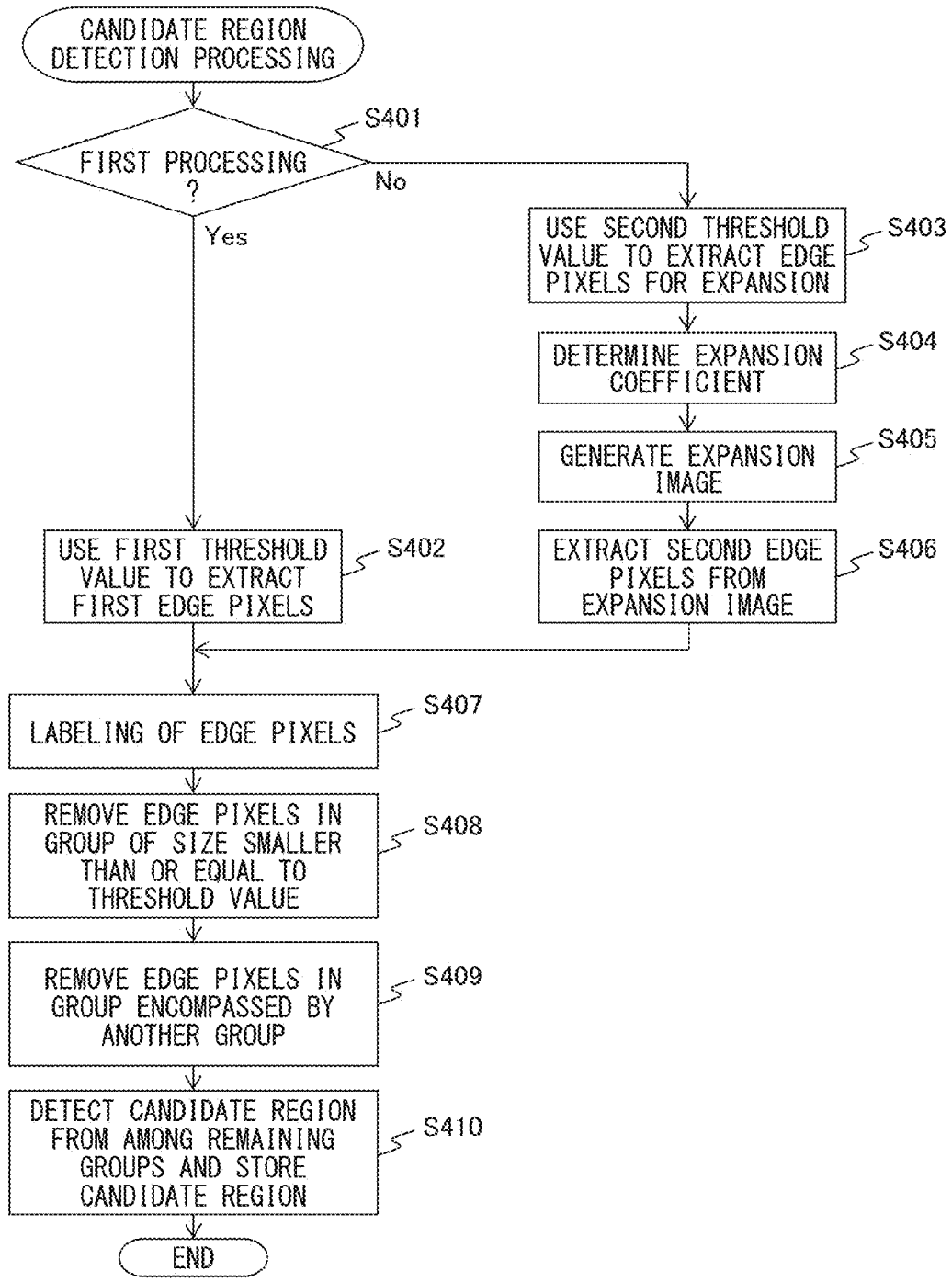
FIG. 10 is a flowchart illustrating an exemplary operation of candidate region detection processing.

FIG. 10 is a flowchart illustrating an exemplary operation of the candidate region detection processing. The flow of the operation illustrated in FIG. 10 is executed at step S301 of the flowchart illustrated in FIG. 9.

First, the image processing circuit 27 determines which of the first processing and the second processing has been selected by the selector 203 (step S401).

When the first processing has been selected, the first edge pixel extractor 204 uses the first threshold value to extract first edge pixels in the horizontal and vertical directions from the second input image. The first edge pixel extractor 204 generates an image made up of pixels extracted as the first edge pixels in either the horizontal or vertical direction in the second input image as a first edge image and stores the first edge image in the second image memory 22 (step S402).

The first edge pixel extractor 204 calculates a neighboring difference value in the horizontal direction for each pixel in the second input image and, when the neighboring difference value exceeds the first threshold value, extracts the pixel on the image as a vertical edge pixel. Furthermore, the first edge pixel extractor 204 performs the same processing for each pixel in the vertical direction to extract horizontal edge pixels.

Figure 11A:
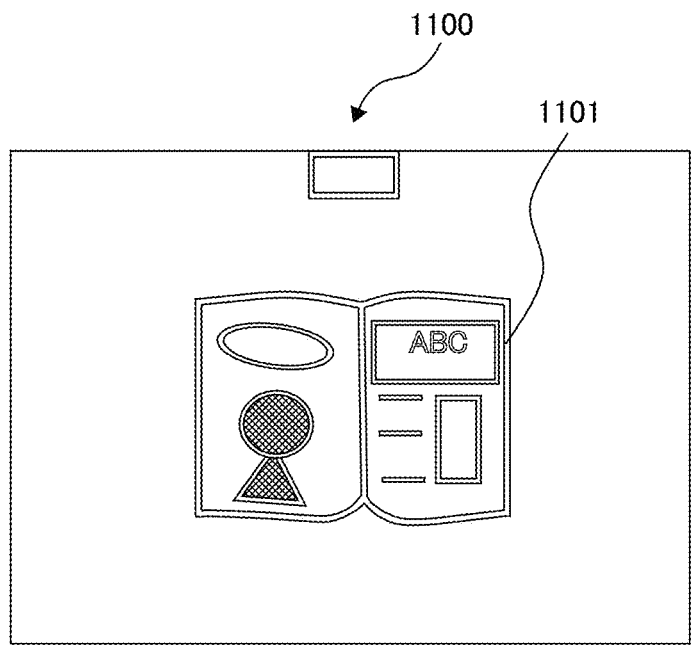
FIG. 11A is a schematic diagram illustrating an image in the candidate region detection processing.

FIGS. 11A to 11E are schematic diagrams illustrating images in the candidate region detection processing. The image 1100 illustrated in FIG. 11A is an example of a first edge image 1100 generated from the second input image 610 in FIG. 6B. In the first edge image 1100, edge pixels 1101 have been detected at the edges of a book 612 in the second input image 610 and in locations of contents whereas no edge pixels have been detected in the location of a pattern 611 on a desk.

Note that the first edge pixel extractor 204 may label the extracted vertical edge pixels and horizontal edge pixels to group them and may remove the first edge pixels included in a group of a size in the horizontal or vertical direction smaller than or equal to a threshold value Th2. The threshold value Th2 is set to a value equivalent to the possible size of dirt on the document placement surface (for example a value equivalent to 3 mm). Additionally, when the area of a group or the area of the circumscribed rectangle region of a group is less than or equal to a threshold value, the first edge pixel extractor 204 may remove the first edge pixels included in the group. Using these methods, edge pixels appearing due to dirt on the document placement surface can be removed.

The first edge pixel extractor 204 generates an image made up of pixels extracted as vertical edge pixels or horizontal edge pixels in the second input image as a first edge image. Note that the first edge pixel extractor 204 may perform expansion/contraction processing on the generated first edge image. When part of connected portions in the second input image is not extracted as first edge pixels, the expansion/contraction processing can interconnect those portions in the first edge image.

On the other hand, when the second processing has been selected, the edge-pixel-for-expansion extractor 205 uses a second threshold value to extract edge pixels for expansion in the horizontal and vertical directions from the second input image. The edge-pixel-for-expansion extractor 205 generates an edge image for expansion which is made up of the pixels extracted as the edge pixels for expansion in the horizontal or vertical direction in the second input image (step S403).

The edge-pixel-for-expansion extractor 205 calculates a neighboring difference value in the horizontal direction for each pixel in the second input image and, when the neighboring difference value exceeds the second threshold value, extracts the pixel on the image as a vertical edge pixel. Furthermore, the edge-pixel-for-expansion extractor 205 performs the same processing for each pixel in the vertical direction to extract horizontal edge pixels. Note that the second threshold value is set to a value lower than the first threshold value so that as many edge pixels for expansion as possible are extracted.

Figure 11B:
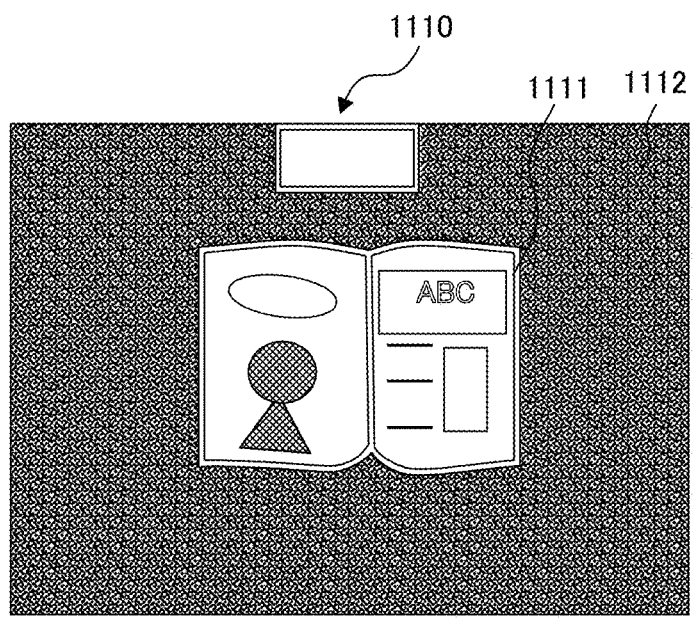
FIG. 11B is a schematic diagram illustrating an image in the candidate region detection processing.

The image 1110 illustrated in FIG. 11B is an example of the edge image for expansion generated from the first input image 800 in FIG. 8. In the edge image for expansion 1110, edge pixels 1111 have been detected at the edges of a book 801 and in the locations of contents in the first input image 800 and edge pixels 1112 have been detected in the location of the pattern 802 on a desk.

Then the expansion image generator 206 determines an expansion coefficient for generating an expansion image, which will be described later, based on the pixels in the presumed background region (step S404). The expansion image is used for submerging edge pixels in the background by expanding the edge pixels to interconnect edge pixels located close to each other. The expansion image generator 206 determines an expansion coefficient in such a manner that the expansion coefficient increases as a ratio of the number of edge pixels for expansion to the total number of pixels in the presumed background region decreases, and the expansion coefficient decreases as the ratio increases. This enables appropriate interconnection between edge pixels located close to each other in the expansion image.

Note that the expansion image generator 206 may determine the expansion coefficient such that a number of first edge pixels is less than or equal to a predetermined number (for example 10% of the total number of pixels) which are extracted from an expanded-color-component image generated based on the expansion coefficient. In that case, the expansion image generator 206 sequentially increments the expansion coefficient, starting from 1, and repeats processing at steps S404 and S405, which will be described later, until the number of first edge pixels extracted from the expanded-color-component image decreases to a predetermined number or less. This can further ensure that pixels that correspond to neighboring stripes in the stripe pattern in the expanded-color-component image are interconnected. Alternatively, the expansion image generator 206 may use a predetermined number (for example 5) as the expansion coefficient.

Then the expansion image generator 206 expands edge pixels for expansion to generate an expansion image based on the determined expansion coefficient (step S405). For each of the pixels in the image made up of the pixels extracted as the edge pixels for expansion, when an edge pixel for expansion is within a range indicated by the expansion coefficient from the pixel, the expansion image generator 206 replaces the pixel with the edge pixel for expansion to generate an expansion image.

Figure 11C:
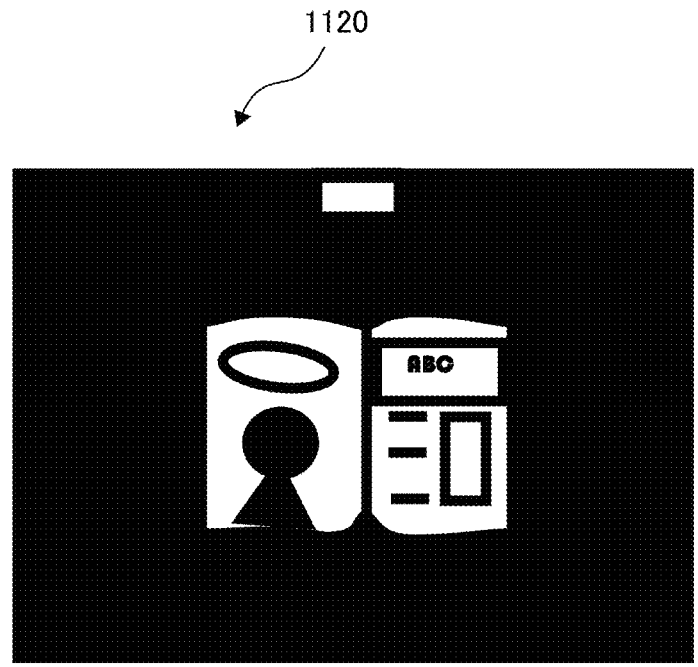
FIG. 11C is a schematic diagram illustrating an image in the candidate region detection processing.

The image 1120 illustrated in FIG. 11C is an example of the expansion image generated from the image 1110 in FIG. 11B. In the expansion image 1120, edge pixels 1112 detected in the pattern 802 on the desk has been expanded and connected.

Then the second edge pixel extractor 207 extracts second edge pixels in the horizontal and vertical directions from the expansion image. The second edge pixel extractor 207 generates, as a first edge image, an image made up of the pixels extracted as the second edge pixels in the horizontal or vertical direction in the expansion image (step S406).

The expansion image consists of two types of pixels, i.e. edge pixels for expansion and edge pixels that are not for expansion and each of the pixels has a binary value. The second edge pixel extractor 207 calculates a neighboring difference value for each pixel in the horizontal direction in the expansion image and, when the neighboring difference value is not 0, extracts the pixel on the image as a vertical edge pixel. The second edge pixel extractor 207 performs the same processing for each pixel in the vertical direction to extract horizontal edge pixels.

Figure 11D:
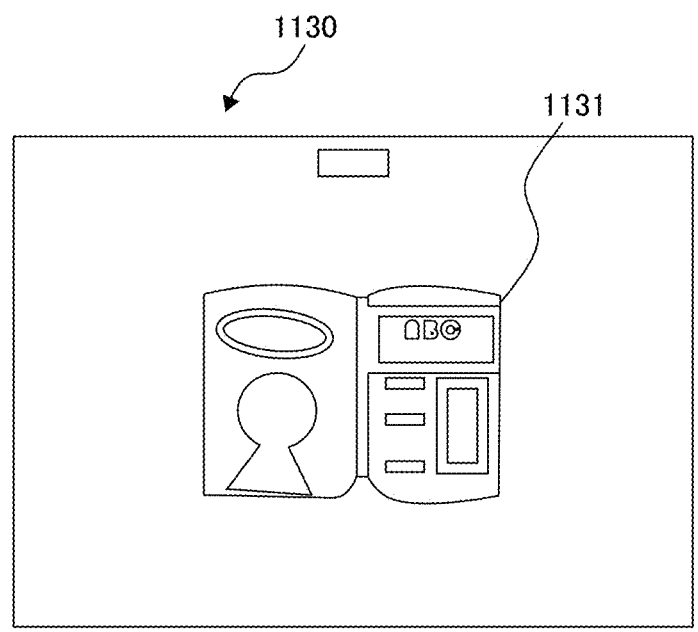
FIG. 11D is a schematic diagram illustrating an image in the candidate region detection processing.

The image 1130 illustrated in FIG. 11D is an example of the first edge image generated from the expansion image 1120 in FIG. 11C. In the first edge image 1130, as in the first edge image 1100 illustrated in FIG. 11A, edge pixels 1131 have been detected at the edges of the book and in the locations of contents whereas no edge pixels have been detected in the location of the pattern on the desk.

Then the candidate region detector 208 determines whether or not each of the edge pixels (i.e. the first edge pixels or the second edge pixels) is connected to another edge pixel in the first edge image, and labels connected edge pixels as one group (step S407). The candidate region detector 208 determines edge pixels that are adjacent to each other in the horizontal direction, the vertical direction or the diagonal directions (in eight neighboring edge positions) to be connected. Note that the first edge pixel extractor 204 may determine edge pixels that are adjacent to each other only in the horizontal or vertical direction (in four neighboring edge positions) to be connected.

Then the candidate region detector 208 determines whether or not the sizes of each group in the horizontal and vertical directions are less than or equal to a threshold value Th3. The candidate region detector 208 removes the edge pixels included in a group having the sizes in the horizontal and vertical directions that are less than or equal to the threshold value Th3 from the first edge image (step S408). The threshold value Th3 is set to the minimum document size the detection of which is guaranteed by an information processing apparatus 20 (for example a value equivalent to 1 inch). Note that the candidate region detector 208 may remove the edge pixels in a group when the size of the group in the horizontal or vertical direction is less than or equal to a threshold value Th3 or when the area of the group or the circumscribed rectangle region of the group is less than or equal to a threshold value. The threshold value to be compared with the area of the circumscribed rectangle region may be a value equivalent to 1 square inch, for example.

Then the candidate region detector 208 determines whether or not each group is encompassed by another group and removes the edge pixels included in a group encompassed by another group from the edge image (step S409).

Figure 11E:
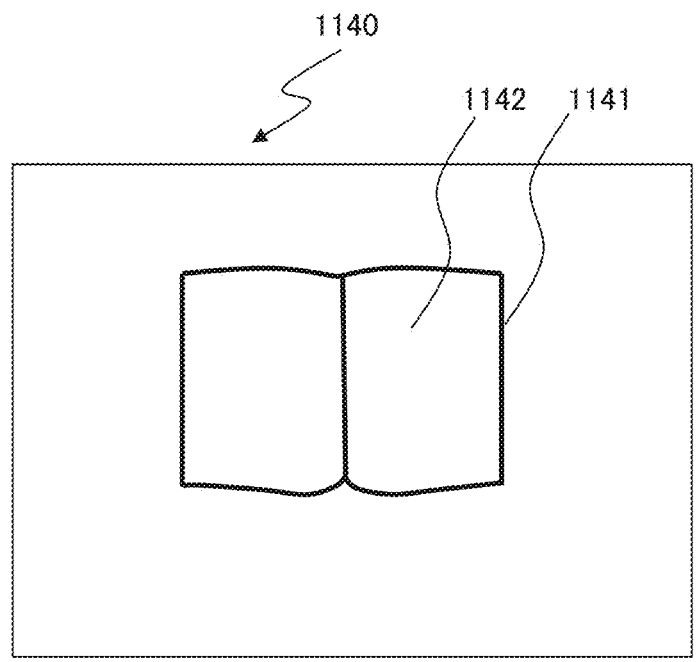
FIG. 11E is a schematic diagram illustrating an image in the candidate region detection processing.

The image 1140 illustrated in FIG. 11E is an example of the edge image resulting from removal of the edge pixels included in a group of a size smaller than or equal to a predetermined size and the edge pixels included in each group encompassed by another group. In the image 1140, edge pixels caused by a portion of the image reading apparatus 10 are removed as the edge pixels included in a group of a size equal to or smaller than a predetermined size and edge pixels caused by contents in the document are removed as the edge pixels included in groups encompassed by another group.

The candidate region detector 208 then detects a region enclosed by edge pixels included in each of the remaining group that have not been removed and detects a region in the first input image that corresponds to each detected region as a candidate region. The candidate region detector 208 stores the circumscribed rectangle region of each candidate region in the first input image in the second image memory 22 (step S410) and ends the sequence of the steps.

In the image 1140 illustrated in FIG. 11E, a region enclosed by connected edge pixels is the outermost circumference 1141 of the group of the connected edge pixels and the region inside the outermost circumference 1141. The region includes not only edge pixels but also all of the pixels 1142 located inside the outer circumference 1141.

Note that a region enclosed by connected edge pixels may be a region that does not include the outermost circumference of a group of connected edge pixels. Alternatively, a region enclosed by connected edge pixels may be a region where the outermost circumference of the group of the connected edge pixels and the region inside the outermost circumference are expanded or contracted by a predetermined number of pixels. Furthermore, extraction/contraction processing may be performed for connected edge pixels as described above to include not only pixels adjacent to each other but pixels located within a predetermined distance from each other and pixels between those pixels. Moreover, when edge pixels located at the both ends of connected edge pixels are within a predetermined distance from each other, pixels located between the edge pixels at the both ends may be included in the connected edge pixels. The predetermined distance may be a value equal to the length of the connected edge pixels multiplied by a predetermined factor (for example 80%), for example. This enables edge pixels at the both ends of edge pixels connected in a horseshoe shape, for example, to be interconnected to form an enclosed region.

Figure 12:
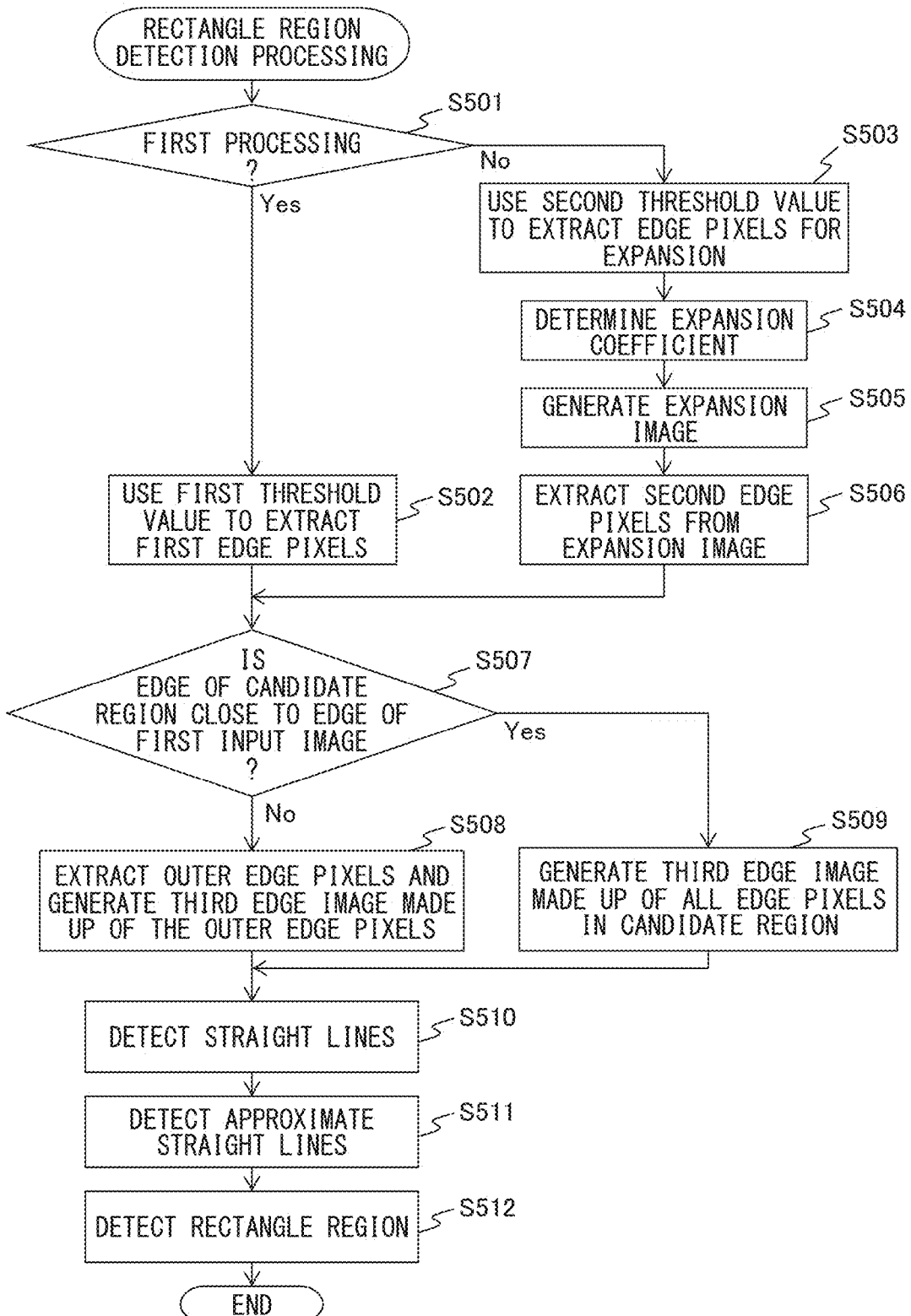
FIG. 12 is a flowchart illustrating an exemplary operation of rectangle region detection processing.

FIG. 12 is a flowchart illustrating an exemplary operation of the rectangle region detection processing. The flow of the operation illustrated in FIG. 12 is executed at step S303 of the flowchart illustrated in FIG. 9.

At steps S501 through S506, the components of the image processing circuit 27 extract first edge pixels or second edge pixels to generate an image made up of the extracted pixels as a second edge image, as in steps S401 through S406 of FIG. 10. The components of the image processing circuit 27 extract first edge pixels and second edge pixels in a candidate region.

The image processing circuit 27 may calculate a threshold value based on pixels in the candidate region and may use the calculated threshold value instead of the first threshold value to extract edge pixels and may generate an image made up of the extracted pixels as a second edge image. In that case, the image processing circuit 27 calculates a neighboring difference value for each of the pixels in the candidate region in the horizontal direction and a neighboring difference value for each pixel in the vertical direction and generates a histogram of the calculated neighboring difference values. The image processing circuit 27 then uses Otsu's binarization method, for example, to determine a threshold value and uses the determined threshold value to binarize the neighboring difference values of the pixels in the second input image, thereby extracting edge pixels.

Alternatively, the image processing circuit 27 may use other method to extract vertical edge pixels and horizontal edge pixels. For example, the image processing circuit 27 decimates the pixels in the first input image with different rates of decimation to generate a plurality of decimated images and extracts vertical edge pixels from each of the first input image and the decimated images to generate edge images made up of vertical edge pixels. The image processing circuit 27 increases the resolution of an edge image generated from the smallest decimated image to the resolution of an edge image generated from the next smallest decimated image to generate an image made up of vertical edge pixels located in the same positions in the two edge images with the same resolution. The image processing circuit 27 repeats the same processing on the generated image and an edge image generated from the next smallest decimated image, thereby ultimately extracting vertical edge pixels located in the same positions as the vertical edge pixels in an edge image generated from the first input image. Furthermore, the image processing circuit 27 performs the same processing to extract horizontal edge pixels. In this way, vertical edge pixels and horizontal edge pixels can be extracted while reducing noise.

Note that the components of the image processing circuit 27 do not perform expansion/contraction processing on the generated second edge image. This can prevent a pattern on the desk, noise and the like in the second edge image from being erroneously connected.

Then the outer edge pixel extractor 209 determines whether or not an edge of the candidate region is close to an edge of the first input image (step S507). When any of the left, right, top and bottom edges of the candidate region is located within a predetermined distance from the left, right, top or bottom edge of the first input image, the outer edge pixel extractor 209 determines that the edges are close to each other; when the edges are not within the predetermined distance, the outer edge pixel extractor 209 determines that the edges are not close to each other. The predetermined distance is chosen to be a value equal to a maximum distance from an edge of the first input image from which edge pixels is unlikely to be extracted although an object appearing in the candidate region intersects the edge of the first input image, and may be a distance equivalent to 10 mm, for example.

Note that when a candidate region does not fit in a predetermined document reading range in the first input image but instead extends beyond the document reading range, the outer edge pixel extractor 209 may determine that an edge of the candidate region is close to an edge of the first input image; when the candidate region fits in the document reading range, the outer edge pixel extractor 209 may determine that none of the edges of the candidate region are close to the edges of the first input image.

When the edges of the candidate region are not close to the edges of the first input image, the outer edge pixel extractor 209 extracts outer edge pixels located at the outer side among the extracted edge pixels. The outer edge pixel extractor 209 generates an image made up of the extracted outer edge pixels as a third edge image (step S508).

Figure 13A:
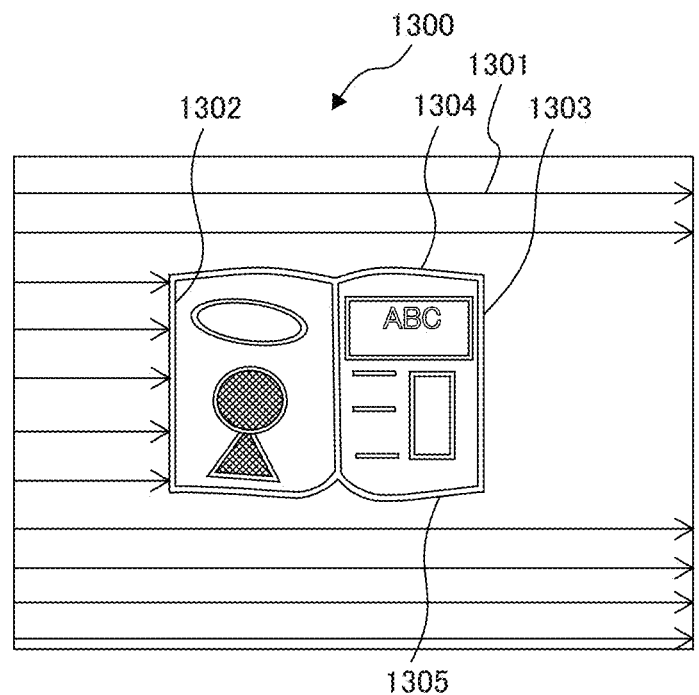
FIG. 13A is a schematic diagram illustrating outer edge pixel extraction processing.
Figure 13B:
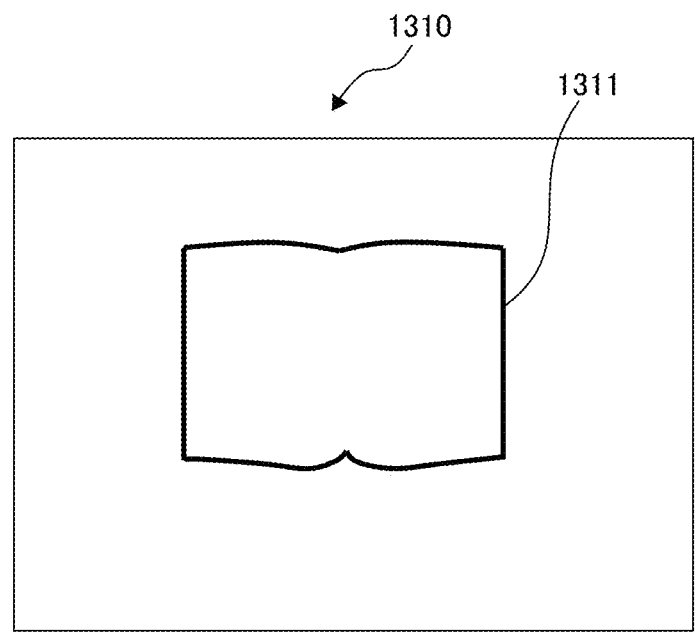
FIG. 13B is a schematic diagram illustrating outer edge pixel extraction processing.

FIGS. 13A and 13B are schematic diagrams illustrating the outer edge pixel extraction processing. The image 1300 illustrated in FIG. 13A is an example of the second edge image. As illustrated in FIG. 13A, the outer edge pixel extractor 209 scans each horizontal line in the second edge image 1300 from left to right as indicated by arrows 1301 to extract, as an outer edge pixel, the first edge pixel 1302 detected. Similarly, the outer edge pixel extractor 209 scans each horizontal line in the second edge image 1300 from right to left to extracts, as an outer edge pixel, the first edge pixel 1303 detected. Similarly, the outer edge pixel extractor 209 scans each vertical line in the second edge image 1300 from top to bottom and bottom to top to extracts, as outer edge pixels, the first edge pixels 1304, 1305, detected. In other words, the outer edge pixel extractor 209 extracts the leftmost and rightmost edge pixels in each horizontal line in the candidate region and the uppermost and lowermost edge pixels in each vertical line in the candidate region as outer edge pixels.

The image 1310 illustrated in FIG. 13B is exemplary outer edge pixels extracted. As illustrated in FIG. 13B, outer edge pixels 1311 are constituted by edge pixels 1302-1305 detected in the second edge image 1300 in FIG. 13A.

On the other hand, when an edge of the candidate region is close to an edge of the first input image, the outer edge pixel extractor 209 generates, as the third edge image, an image made up of all of the edge pixels in the candidate region (step S509). In this case, the rectangle region detector 211 detects a rectangle region from among all of the edge pixels in the candidate region in rectangle region detection processing, which will be described later.

Figure 14A:
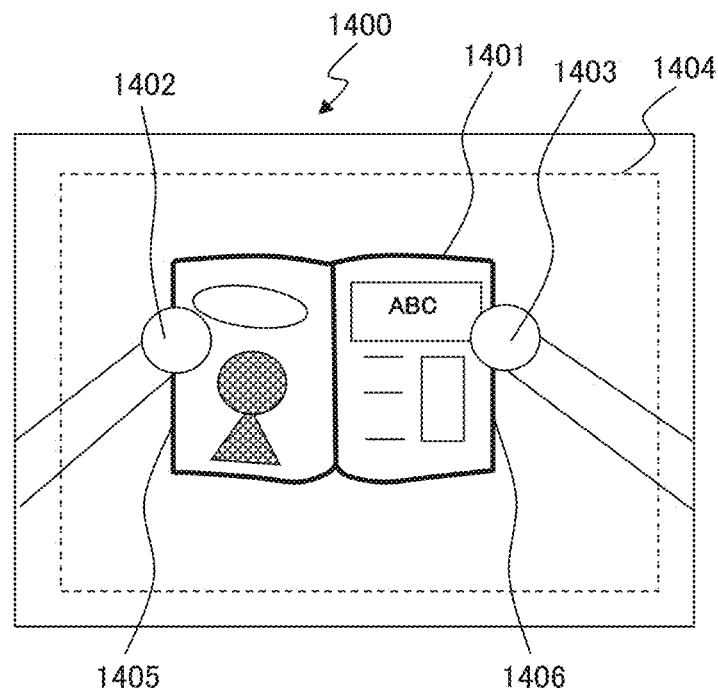
FIG. 14A is a schematic diagram illustrating an example in which a candidate region and an edge of an input image are close to each other.
Figure 14B:
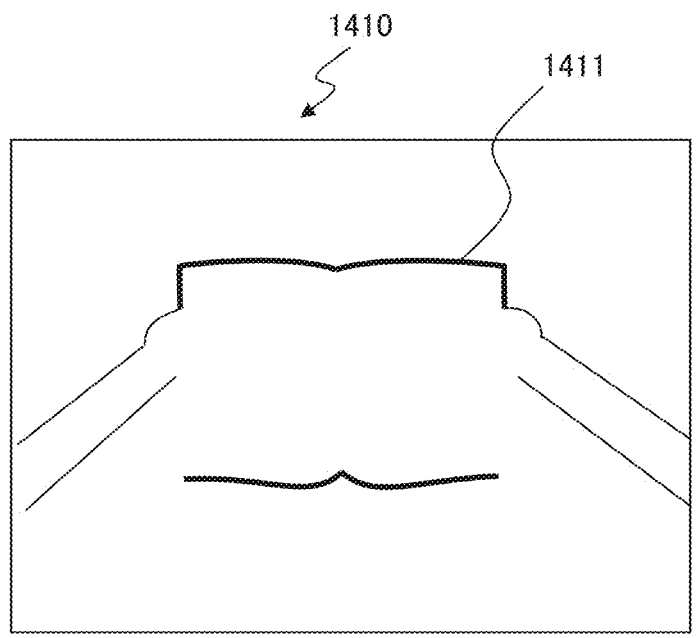
FIG. 14B is a schematic diagram illustrating an example in which a candidate region and an edge of an input image are close to each other.

FIGS. 14A and 14B are schematic diagrams illustrating an example in which an edge of a candidate region is close to an edge of the first input image. The image 1400 illustrated in FIG. 14A illustrates a situation in which a document 1401 is held by the hands 1402 and 1403 of a user. In this example, edge pixels that appear due to the presence of the hands 1402 and 1403 of the user do not fit into a document reading range 1404 but instead extend beyond the document reading range 1404 to edges of the first input image. The image 1410 in FIG. 14B illustrates an example of outer edge pixels extracted from the image 1400 in FIG. 14A. As illustrated in FIG. 14B, edges of the document 1405 and 1406 that are located interiorly to the hands 1402 and 1403 of the user are not extracted as outer edge pixels 1411. In such a case, exclusion of edges of the document from extraction can be prevented by generating an image made up of all of the edge pixels in the candidate region as a third edge image.

This can also prevent exclusion of edges of the document from extraction due to interconnection between edge pixels detected in an edge of the document and edge pixels detected in a pattern on the desk when the edge strength of a pattern or the like on the desk on which the document is placed is high.

Note that when an edge of a candidate region is close to an edge of the first input image, the outer edge pixel extractor 209 may remove some of the edge pixels in the candidate region from the third edge image. For example, when an edge of the candidate region is close to a horizontal edge of the first input image, the outer edge pixel extractor 209 detects a vertical straight line in the candidate region; when an edge of the candidate region is close to a vertical edge of the first input image, the outer edge pixel extractor 209 detects a horizontal straight line in the candidate region. The outer edge pixel extractor 209 removes edge pixels between two straight lines detected at the outermost locations from the third edge image. This can exclude contents and the like in the document from the document edge detection to improve the accuracy of the document edge detection.

Then the straight line detector 210 detects a plurality of straight lines in the third edge image (step S510). The straight line detector 210 uses the Hough transform to detect straight lines. Note that the straight line detector 210 may use the least-square method to detect straight lines. Alternatively, the straight line detector 210 may use the least-square method for edge pixels within a predetermined distance from a straight line detected by using the Hough transform to detect a straight line. The predetermined distance is chosen as appropriate in accordance with the environment in which the image processing system 1 is used or other factors and may be set to a distance equivalent to 2 mm, for example.

The straight line detector 210 then detects approximate straight lines in the third edge image (step S511).

Figure 15A:
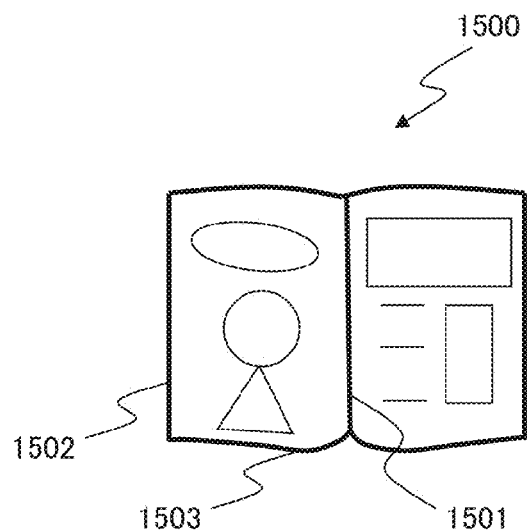
FIG. 15A is a schematic diagram for illustrating an approximate straight line.
Figure 15B:
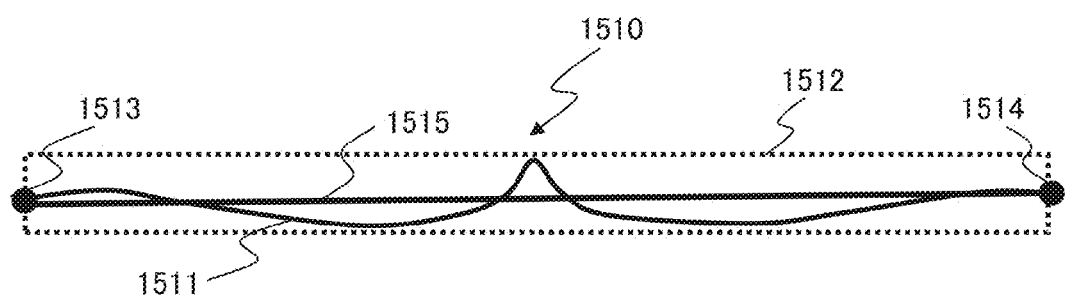
FIG. 15B is a schematic diagram for illustrating an approximate straight line.

FIGS. 15A and 15B are schematic diagrams for illustrating approximate straight lines. In a first input image 1500 acquired by imaging a book as illustrated in FIG. 15A, an edge 1502 parallel to the saddle-stitched portion 1501 of the book is detected as a straight line. However, an edge 1503 perpendicular to the saddle-stitched portion 1501 can distort at a portion near the saddle-stitched portion 1501 and therefore may not be detected as a straight line.

To avoid this, the straight line detector 210 labels adjacent edge pixels 1511 to cluster the edge pixels 1511 together into a group 1512 as illustrated in the edge image 1510 in FIG. 15B. The straight line detector 210 detects, as an approximate straight line, a straight line 1515 that links an edge pixel 1513 and an edge pixel 1514 that are located at the ends of the group 1512 in the horizontal direction or the vertical direction among the edge pixels included in the group 1512.

Then the rectangle region detector 211 detects a rectangle region composed of the straight lines or approximate straight lines detected by the straight line detector 210 (step S512) and ends the sequence of the steps. In this way, the rectangle region detector 211 detects a rectangle region from the first edge pixels or the second edge pixels.

The rectangle region detector 211 extracts a plurality of candidate rectangle regions each of which is composed of four straight lines or approximate straight lines which consist of two pairs of the plurality of the straight lines or approximate straight lines detected by the straight line detector 210 intersecting at substantially right angles. The rectangle region detector 211 first selects a horizontal straight line (hereinafter referred to as a first horizontal line) and extracts a horizontal straight line (hereinafter referred to as a second horizontal line) that is substantially parallel (for example within)±3° to the selected straight line and at a distance greater than or equal to a threshold value Th4 from the selected straight line. The rectangle region detector 211 then extracts a vertical straight line (hereinafter referred to as a first vertical line) that is substantially orthogonal (for example within ±3° from 90°) to the first horizontal line. The rectangle region detector 211 then extracts a vertical straight line (hereinafter referred to as a second vertical line) that is substantially orthogonal to the first horizontal line and at a distance greater than or equal to a threshold value Th5 from the first vertical line. Note that the threshold values Th4 and Th5 are predetermined in accordance with the size of a document to be read by the image reading apparatus 10 and may equal to each other.

The rectangle region detector 211 extracts all combinations of the first horizontal lines, second horizontal lines, first vertical lines, and second vertical lines that satisfy the conditions described above among all of the straight lines or approximate straight lines detected by the straight line detector 210 and extracts rectangle regions each of which is formed by each of the extracted combinations as candidate rectangle regions. The rectangle region detector 211 calculates the areas of the extracted candidate rectangle regions and removes candidate rectangle regions that have areas less than a predetermined value. The rectangle region detector 211 detects a candidate rectangle region that has the largest area among the remaining candidate rectangle regions as a rectangle region. On the other hand, when no candidate rectangle region has been left, the rectangle region detector 211 detects no rectangle region.

Note that the rectangle region detector 211 may calculate the ratio of the number of edge pixels within a predetermined distance (for example a distance equivalent to 2 mm) from each side of each candidate rectangle region to the total number of the pixels within the predetermined distance and may multiply the area of each candidate rectangle region by the ratio to assign a weight to the candidate rectangle region. This enables detection of rectangle regions composed of straight lines that clearly represent the border of the document. Alternatively, the rectangle region detector 211 may calculate, for each candidate rectangle region, a score for each angle of the candidate rectangle region that represents the likelihood of being a corner and may use the score to assign a weight to the area of the candidate rectangle region.

Figure 16:
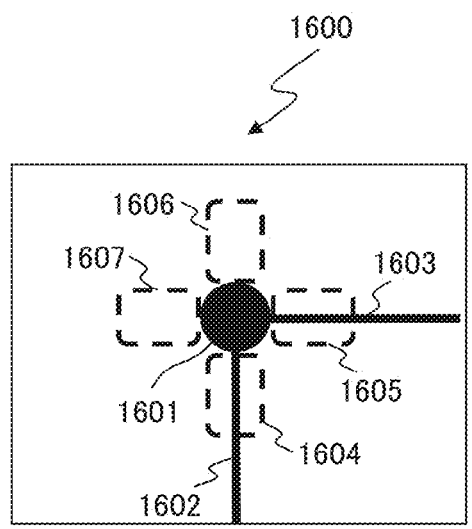
FIG. 16 is a schematic diagram for illustrating an evaluation score of a corner of a candidate rectangle region.

FIG. 16 is a schematic diagram for illustrating the score of each corner of a candidate rectangle region. In the image 1600 illustrated in FIG. 16, a point 1601 represents a corner of a candidate rectangle region and straight lines 1602, 1603 represent sides of a candidate rectangle region. When ends of the straight lines 1602, 1603 are in contact with each other, the point 1601 is likely to be a corner of a rectangle region. When the ends of the straight lines 1602, 1603 are not in contact with each other or the straight lines 1602, 1603 cross each other, the point 1601 is unlikely to be a corner of a rectangle region.

The base of the scoring is 0. Determination is made as to whether or not there is an edge pixel in each horizontal line in a region 1604 within a predetermined distance from a side 1602 near the corner 1601. When there is an edge pixel in a horizontal line, 1 is added to the score. The range near each corner and the predetermined distance from each side are chosen as appropriate according to the environment in which the image processing system 1 is used or other factors and may be a range within a distance equivalent to 5 mm from each corner and a distance equivalent to 2 mm from each side, for example. Similarly, determination is made as to whether or not there is an edge pixel in each vertical line in a region 1605 within the predetermined distance from a side 1603 near the corner 1601. When there is an edge pixel in a vertical line, 1 is added to the score. Furthermore, determination is made as to whether or not there is an edge pixel in each horizontal line in a region 1606 within the predetermined distance from a line extended from the side 1602 near the corner 1601. When there is an edge pixel in a horizontal line, 1 is subtracted from the score. Similarly, determination is made as to whether or not there is an edge pixel in each vertical line in a region 1607 within the predetermined distance from a line extended from the side 1603 near the corner 1601. When there is an edge pixel in a vertical line, 1 is subtracted from the score. The rectangle region detector 211 normalizes the scores so that the lowest possible score is 0 and the highest possible score is 1 and multiplies the area of each candidate rectangle region by the normalized value to assign a weight, thereby the rectangle region detector 211 can detects a rectangle region that clearly represents four corners.

Figure 17A:
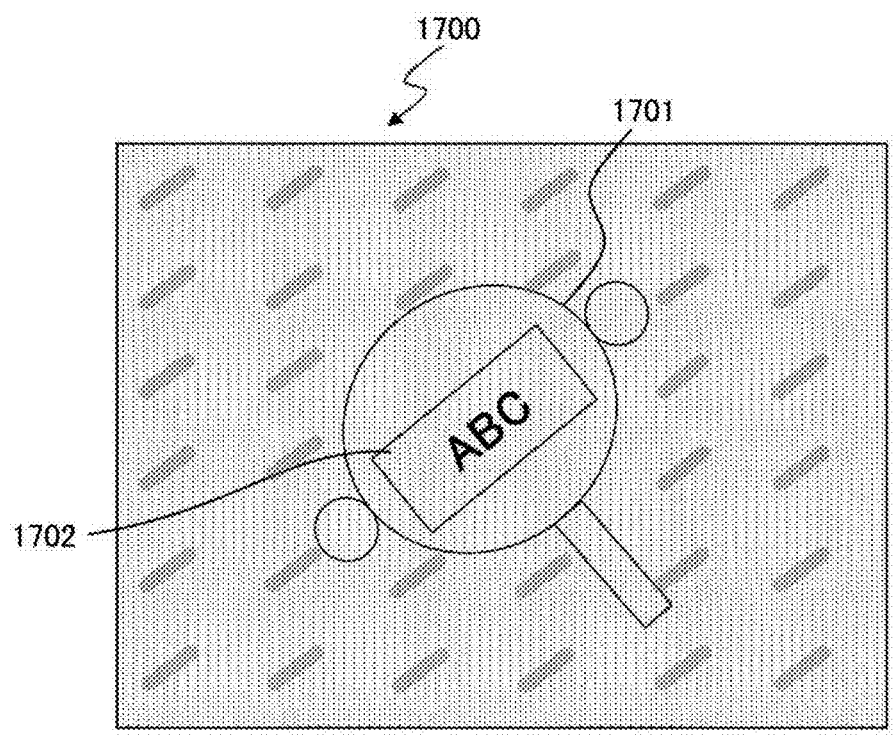
FIG. 17A is a schematic diagram illustrating rectangle region detection processing.
Figure 17B:
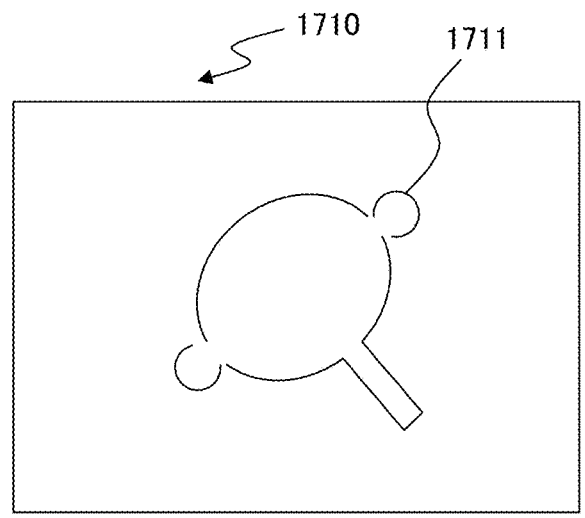
FIG. 17B is a schematic diagram illustrating rectangle region detection processing.
Figure 17C:
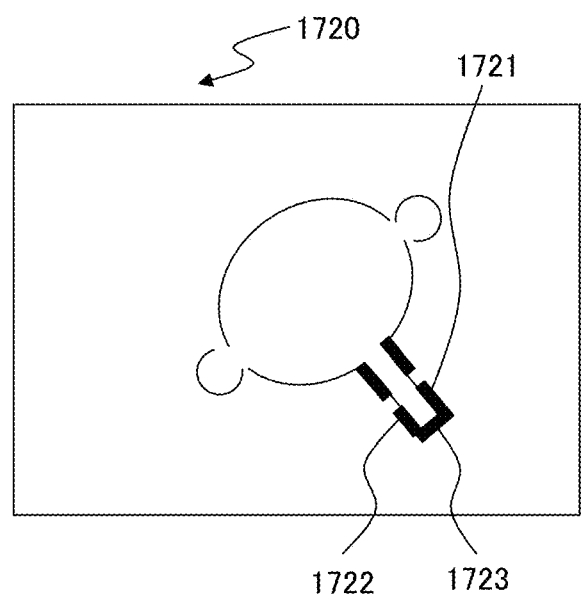
FIG. 17C is a schematic diagram illustrating rectangle region detection processing.

FIGS. 17A to 17C are schematic diagrams for illustrating the rectangle region detection processing executed on a non-rectangle region image. The image 1700 illustrated in FIG. 17A is an example of a first input image acquired by imaging a round-fan-shaped object 1701 that has a rectangular graphic 1702. The image 1710 illustrated in FIG. 17B is an example of a third edge image generated from the first input image 1700. As illustrated in FIG. 17B, the third edge image 1710 includes outer edge pixels 1711 and the rectangular graphic 1702 is not extracted in the third edge image 1710. The image 1720 illustrated in FIG. 17C is an example of straight lines extracted from the third edge image 1710. As illustrated in FIG. 17C, a handle portion 1721-1723 of the shape of the round fan is detected as straight lines in the third edge image 1710. However, a rectangle region composed of four straight lines consisting of two pairs of lines intersecting at substantially right angles is not detected in the examples illustrated in FIGS. 17A to 17c.

Figure 18:
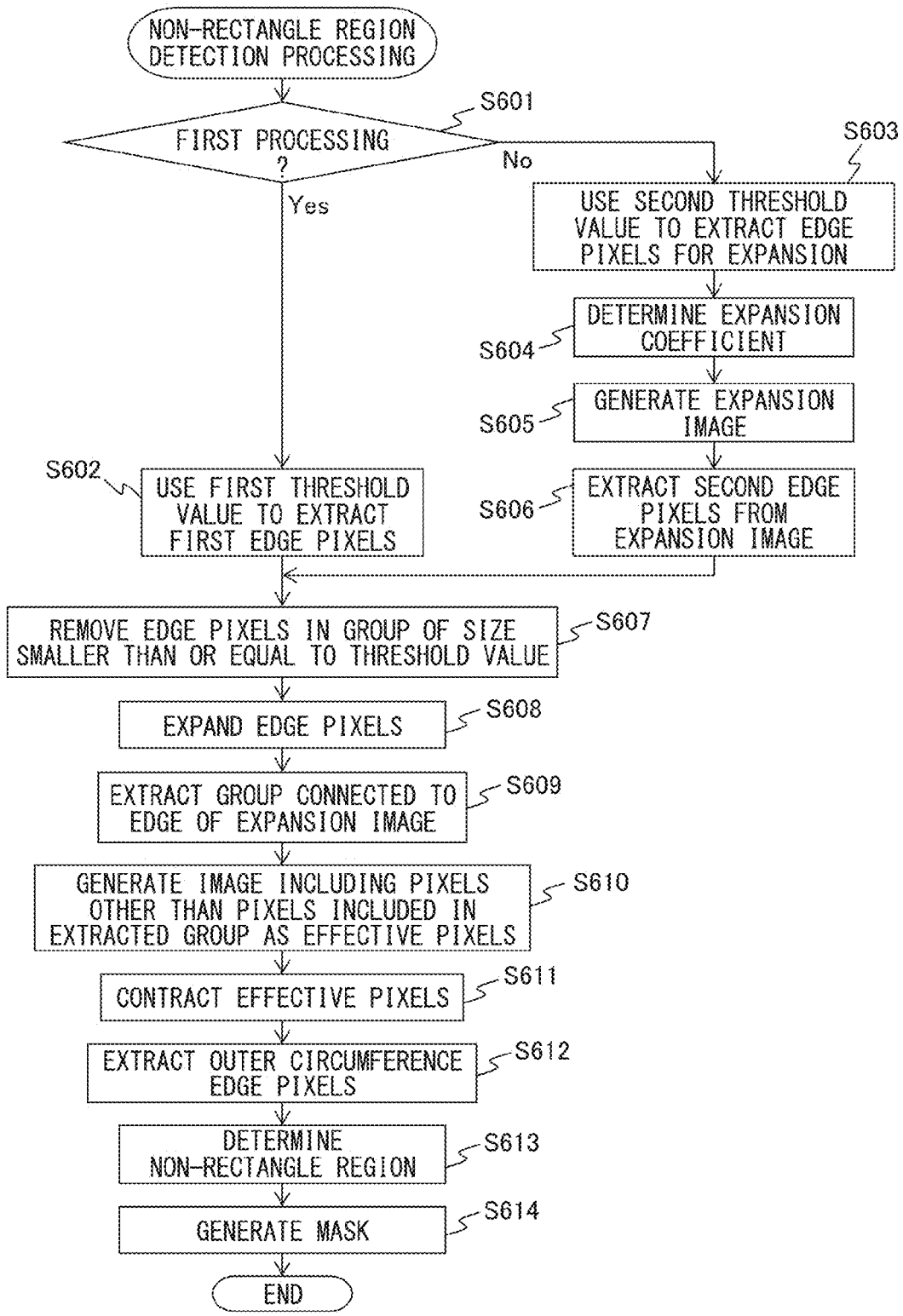
FIG. 18 is a flowchart illustrating an exemplary operation of non-rectangle region detection processing.

FIG. 18 is a flowchart illustrating an exemplary operation of non-rectangle region detection processing. The flow of the operation illustrated in FIG. 18 is executed at step S306 of the flowchart illustrated in FIG. 9.

At steps S601 through S606, the components of the image processing circuit 27 extract first edge pixels or second edge pixels as in steps S401 through S406 of FIG. 10 or steps S501 through S506 of FIG. 12. The components of the image processing circuit 27 generate an image made up of the extracted pixels as a fourth edge image. However, the components of the image processing circuit 27 extract first edge pixels or second edge pixels in the horizontal, vertical and diagonal directions in a candidate region.

The first edge pixel extractor 204, the edge-pixel-for-expansion extractor 205, and the second edge pixel extractor 207 calculate neighboring difference values for each of the pixels in each image in the vertical direction from top to bottom, the horizontal direction from left to right, the diagonal direction from bottom left to top right, and the diagonal direction from bottom right to top left. When the absolute value of any of the calculated neighboring difference values exceeds the first threshold value, the first edge pixel extractor 204, the edge-pixel-for-expansion extractor 205, and the second edge pixel extractor 207 determine pixels on the image as edge pixels.

Note that the image processing circuit 27 may calculate a threshold value based on the pixels in a candidate region, may use the calculated threshold value instead of the first threshold value to extract edge pixels, and may generate an image made up of the extracted pixels as a fourth edge image. In that case, the image processing circuit 27 calculates, for each pixel in the candidate region, a neighboring difference value in the horizontal direction, a neighboring difference value in the vertical direction and neighboring difference values in the diagonal directions and generates a histogram of the calculated neighboring difference values. The image processing circuit 27 then determines a threshold value by using Otsu's binarization method, for example, and uses the determined threshold value to binarize the neighboring difference values for each pixel in the second input image, thereby extracting edge pixels.

Then the first edge pixel extractor 204 or the second edge pixel extractor 207 labels the extracted edge pixels to group the edge pixels. The first edge pixel extractor 204 or the second edge pixel extractor 207 removes the edge pixels included in a group having a size smaller than or equal to the threshold value Th2 (step S607). This can remove noise components included in the fourth edge image.

Then the first edge pixel extractor 204 or the second edge pixel extractor 207 expands edge pixels in the generated fourth edge image to generate a second expansion image (step S608). When part of connected portions in the second input image is not extracted as edge pixels, the expansion can interconnect those portions in the second expansion image.

Then the outer circumference edge pixel extractor 212 executes labeling of pixels other the edge pixels (non-edge pixels) in the second expansion image to extract a group that connects to an edge of the second expansion image (step S609).

Figure 19A:
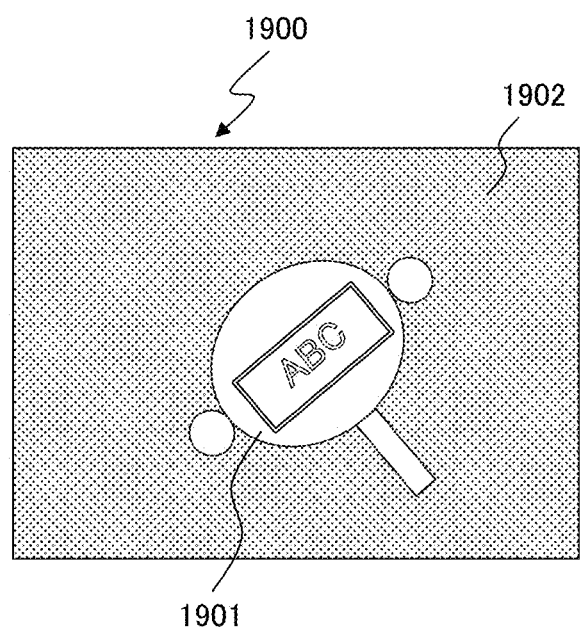
FIG. 19A is a schematic diagram illustrating an image in non-rectangle region detection processing.
Figure 19B:
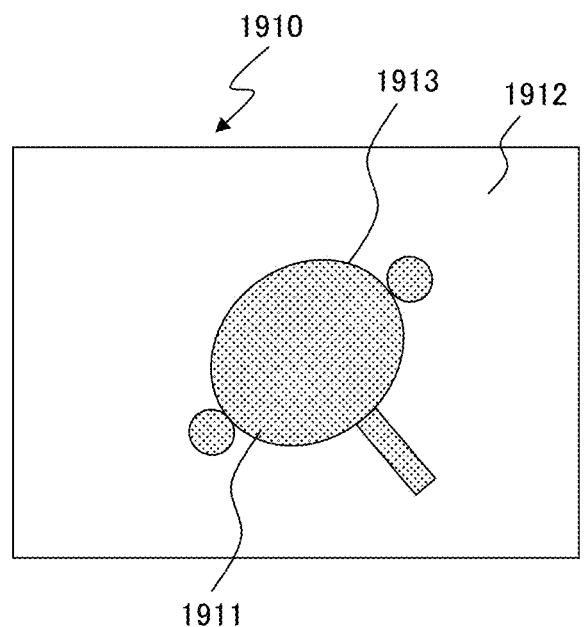
FIG. 19B is a schematic diagram illustrating an image in non-rectangle region detection processing.

FIGS. 19A and 19B are schematic diagrams illustrating images in the non-rectangle region detection processing. As in the image 1900 illustrated in FIG. 19A, a group 1902 that connects to the edges of the second expansion image is a group of non-edge pixels located outside the outer circumference of a document 1901.

Then the outer circumference edge pixel extractor 212 generates an image in which the pixels included in the extracted group are invalid pixels and the other pixels are valid images (step S610).

The image 1910 illustrated in FIG. 19B is an example of the image generated at step S610. In the image 1910, the pixels 1912 included in the extracted group are invalid pixels and the other pixels 1911 are valid pixels.

Then the outer circumference edge pixel extractor 212 contracts the valid pixels in the generated image to generate a construction image (step S611). The contraction processing is executed in order to restore the edge pixels expanded at step S608 to the original size. Accordingly, the non-rectangle region detector 213 contracts the non-rectangle region by the same degree as the degree of expansion of the edge pixels expanded at step S608. Note that the non-rectangle region detector 213 may contract the non-rectangle region by a degree greater than the degree of expansion of the edge pixels expanded at step S608. In that case, edge pixels detected due to a pattern on the desk on which the document is placed or the like can be removed from the valid pixels when the edge strength of the pattern of the desk or the like is high.

The outer circumference edge pixel extractor 212 then extracts edge pixels making up the outer circumference of the valid pixels in the contracted image as outer circumference edge pixels (step S612).

As illustrated in FIG. 19B, the outer circumference edge pixels 1913 making up the outer circumference of the valid pixels 1911 are edge pixels that make up the outer circumference of connected edge pixels.

Then the non-rectangle region detector 213 detects a non-rectangle region surrounded by the extracted outer circumference edge pixels (step S613). When the non-rectangle region detector 213 detects a plurality of non-rectangle regions, the non-rectangle region detector 213 selects only the largest non-rectangle region in area as a detected non-rectangle region. This can remove noise generated due to a pattern on the desk or the like.

Then, based on the detected non-rectangle region, the mask generator 214 generates a mask for separating a background from an image to be cut out (step S614). The mask includes the same number of pixels as the pixels of the cut-out image in each of the horizontal and vertical directions and is formed by an image including valid pixels which are pixels corresponding to the detected non-rectangle region and invalid pixels which are the other pixels. The information processing apparatus 20 can extract a separated image by using the mask to extract only the pixels that correspond to the positions of the valid pixels in the mask from the cut-out image.

Note that the image processing circuit 27 may omit the candidate region detection processing illustrated at step S301 of FIG. 9 and may execute the rectangle region detection processing and the non-rectangle region detection processing on the entire first input image. In that case, again, the information processing apparatus 20 can properly determine a region in which an image of a document is to be cut out.

Furthermore, the image processing circuit 27 may use edge pixels for detecting a candidate region to detect a rectangle region or a non-rectangle region instead of separately detecting edge pixels for detecting a candidate region, edge pixels for detecting a rectangle region, and edge pixels for detecting a non-rectangle region. In that case, the information processing apparatus 20 can reduce processing load of the edge pixel detection processing and can speed up the processing.

Furthermore, the image processing circuit 27 may omit the non-rectangle region detection processing at step S306 of FIG. 9, and may use a candidate region as a non-rectangle region when no rectangle region has been detected. In that case, the outer circumference edge pixel extractor 212 extracts edge pixels that make up the outer circumference of the candidate region as outer circumference edge pixels and the non-rectangle region detector 213 detects the candidate region as a non-rectangle region.

As has been described in detail, the information processing apparatus 20 can properly determine a region in which an image of a document is to be cut out by operating in accordance with the flowcharts illustrated in FIGS. 5, 9, 10, 12 and 18. In particular, the information processing apparatus 20 can accurately detect a document region even when the input image includes a complicated background or a high-contrast background.

Furthermore, depending on an input image, the information processing apparatus 20 selects the first processing which reduces the number of edge pixels detected in accordance with a background or the second processing which increases the number of edge pixels detected in accordance with a background to submerge edge pixels. This enables the information processing apparatus 20 to properly detect a document region by performing the first processing for an input image in which the difference between the contrast at edges of a document and the contrast caused by a pattern in the background is large and performing the second processing for an input image in which the difference is small.

Furthermore, the information processing apparatus 20 can accurately detect the contour of an imaging subject and remove the background even when the imaging subject has a non-rectangular shape, such as a solid, a hand, or a photo clipping.

Furthermore, the information processing apparatus 20 uses only vertical and horizontal edge pixels as the edge pixels for detecting a rectangle region and uses diagonal edge pixels in addition to the vertical and horizontal edge pixels as the edge pixels for detecting a non-rectangle region. Thus, the information processing apparatus 20 can reduce the influence of noise due to a background or the like when detecting a rectangle region consisting of straight lines, which can be detected even when a small portion of edges is missing while preventing missing of a portion of edges when detecting a non-rectangle region, which has curves, which are difficult to detect when a portion of edges is missing.

Figure 20:
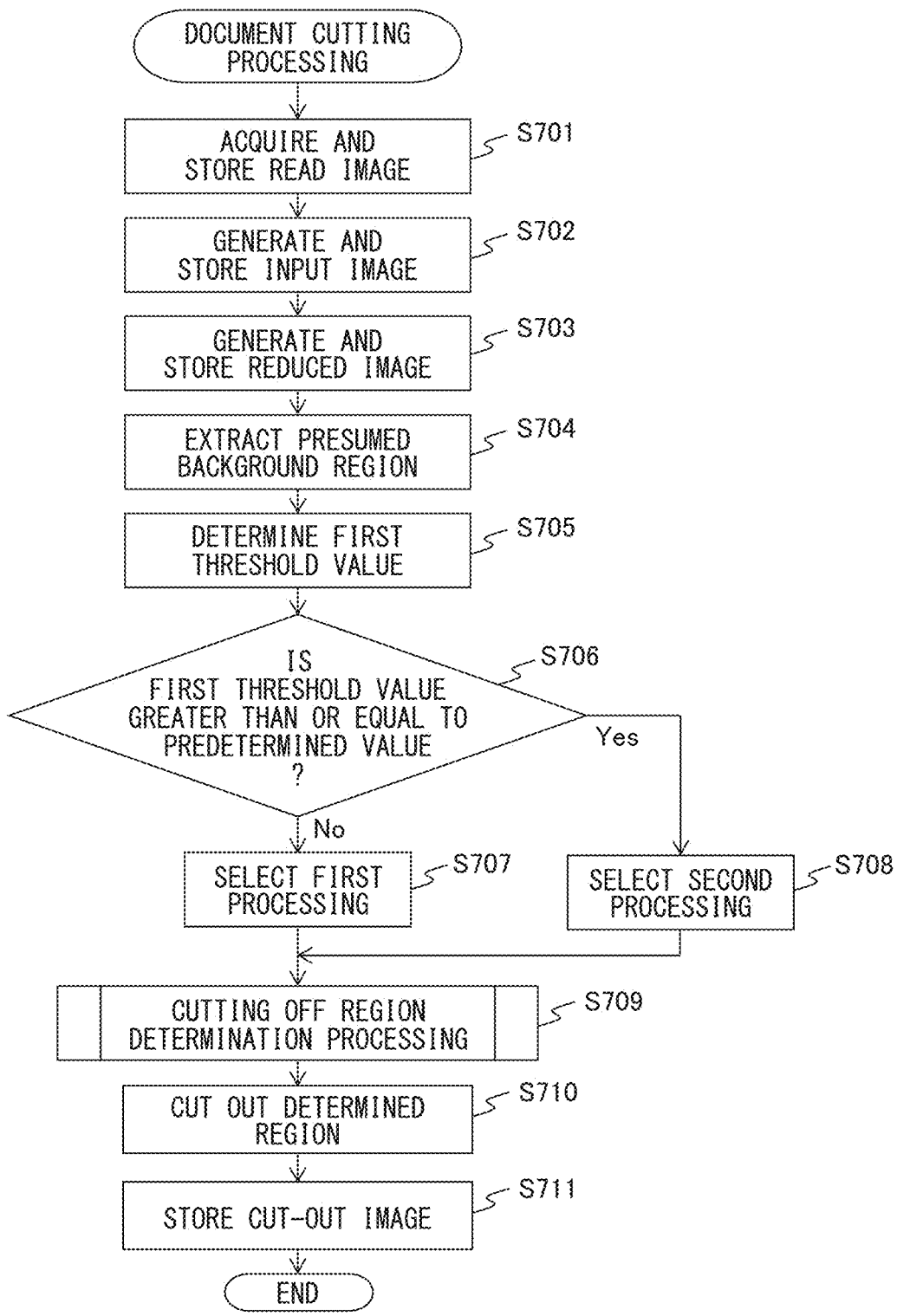
FIG. 20 is a flowchart illustrating another exemplary operation of document cutting processing.

FIG. 20 is a flowchart illustrating another exemplary operation of the document cutting processing. The flowchart can be executed in the information processing apparatus 20 instead of the flowchart described previously and illustrated in FIG. 5. In the flowchart illustrated in FIG. 20, unlike in the flowchart illustrated in FIG. 5, the first processing or the second processing is selected by a selector 203 depending on whether the first threshold value is greater than or equal to a predetermined value. Processing at steps S701 through S705, S710 and S711 illustrated in FIG. 20 is the same as the processing at steps S201 through S205, S211 and S212 illustrated in FIG. 5 and therefore the description of these steps will be omitted and only the processing at steps S706 through S709 will be descried below.

When the threshold value determination module 202 determines a first threshold value at step S705, the selector 203 determines whether or not the determined first threshold value is greater than or equal to a predetermined value (step S706). When the first threshold value is less than the predetermined value, the selector 203 selects the first processing as the method for detecting a document region (step S707); when the first threshold value is greater than or equal to the predetermined value, the selector 203 selects the second processing as the method for detecting a document region (step S708). The predetermined value is chosen to be equal to a neighboring difference value calculated at an edge of a white document placed on a white desk, for example. Note that the information processing apparatus 20 may determine a threshold value by Otsu's binarization method from a histogram of neighboring difference values of the pixels in an entire first input image in the horizontal and vertical directions and may use the determined threshold value as the predetermined value.

Then the components of the image processing circuit 27 perform cutting region determination processing in accordance with the processing selected by the selector 203 (step S709). In other words, when the first threshold value is less than the predetermined value, the selector 203 selects to use first edge pixels for detecting a document region; when the first threshold value is greater than or equal to the predetermined value, the selector 203 selects to use second edge pixels.

As has been described in detail above, the information processing apparatus 20 operates in accordance with the flowcharts illustrated in FIGS. 20, 9, 10, 12 and 18 to execute the first processing which reduces the number of edge pixels detected in accordance with a background when the contrast caused by a pattern in the background is low. On the other hand, when the contrast caused by a pattern in a background is high, the information processing apparatus 20 executes the second processing which increases the number of edge pixels detected in accordance with the background to submerge the edge pixels. In this way, the information processing apparatus 20 is capable of properly removing a background from an input image.

Figure 21:
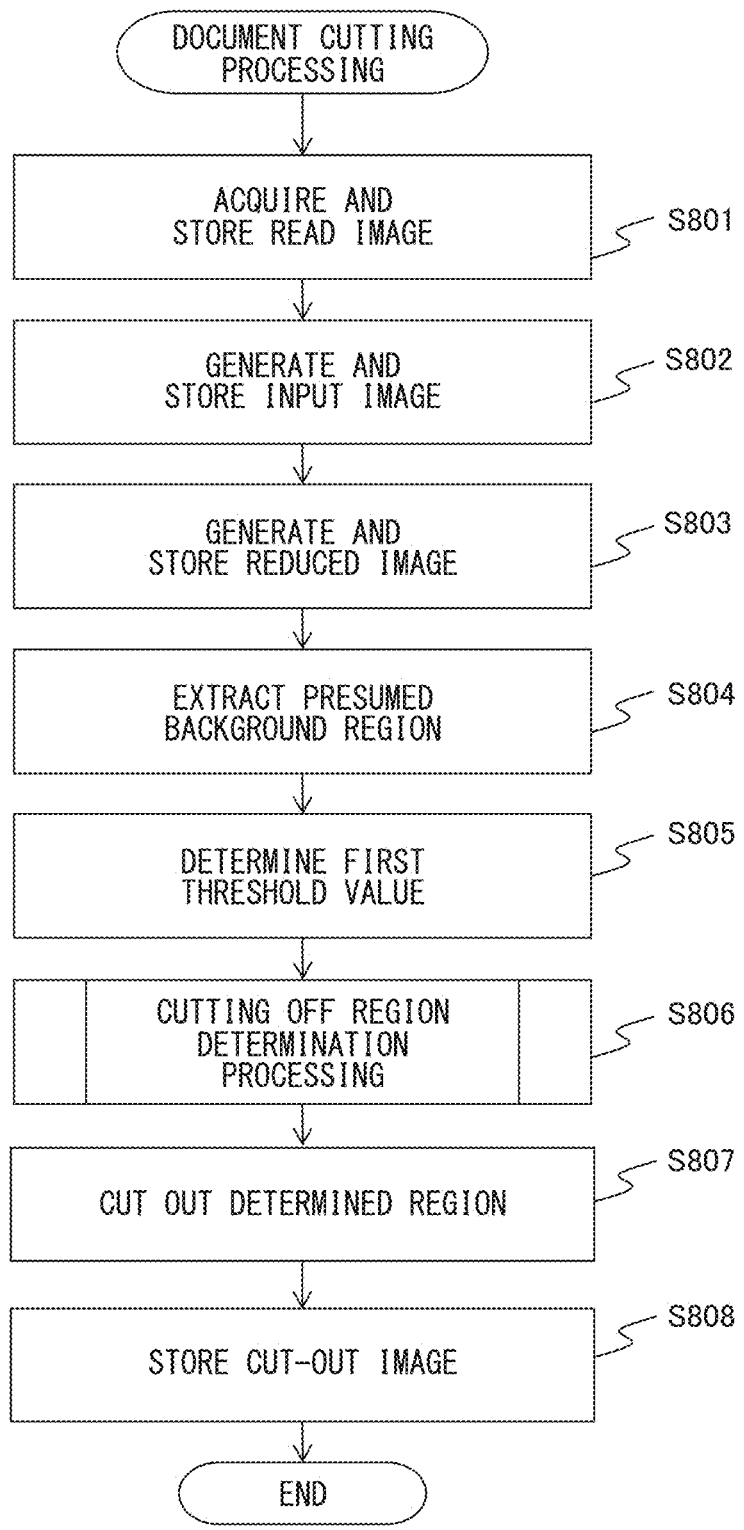
FIG. 21 is a flowchart illustrating yet another exemplary operation of document cutting processing.

FIG. 21 is a flowchart illustrating a yet another exemplary operation of the document cutting processing. The operation in the flowchart can be executed in the information processing apparatus 20 instead of the operation in the flowchart illustrated in FIG. 5 described previously. In the flowchart illustrated in FIG. 21, unlike in the flowchart illustrated in FIG. 5, the document region detector 215 detects a document region from both of first edge pixels and second edge pixels. Processing at steps S801 through S805, S807 and S808 illustrated in FIG. 21 is the same as the processing at steps S201 through S205, S211 and S212 illustrated in FIG. 5 and therefore the description of the steps will be omitted and only the processing at step S806 will be described below.

When the threshold value determination module 202 determines a first threshold value at step S805, the components of the image processing circuit 27 perform cutting off region determination processing (step S806). In other words, the cutting off region determination processing is performed without selection of the first processing or the second processing by a selector 203.

Figure 22:
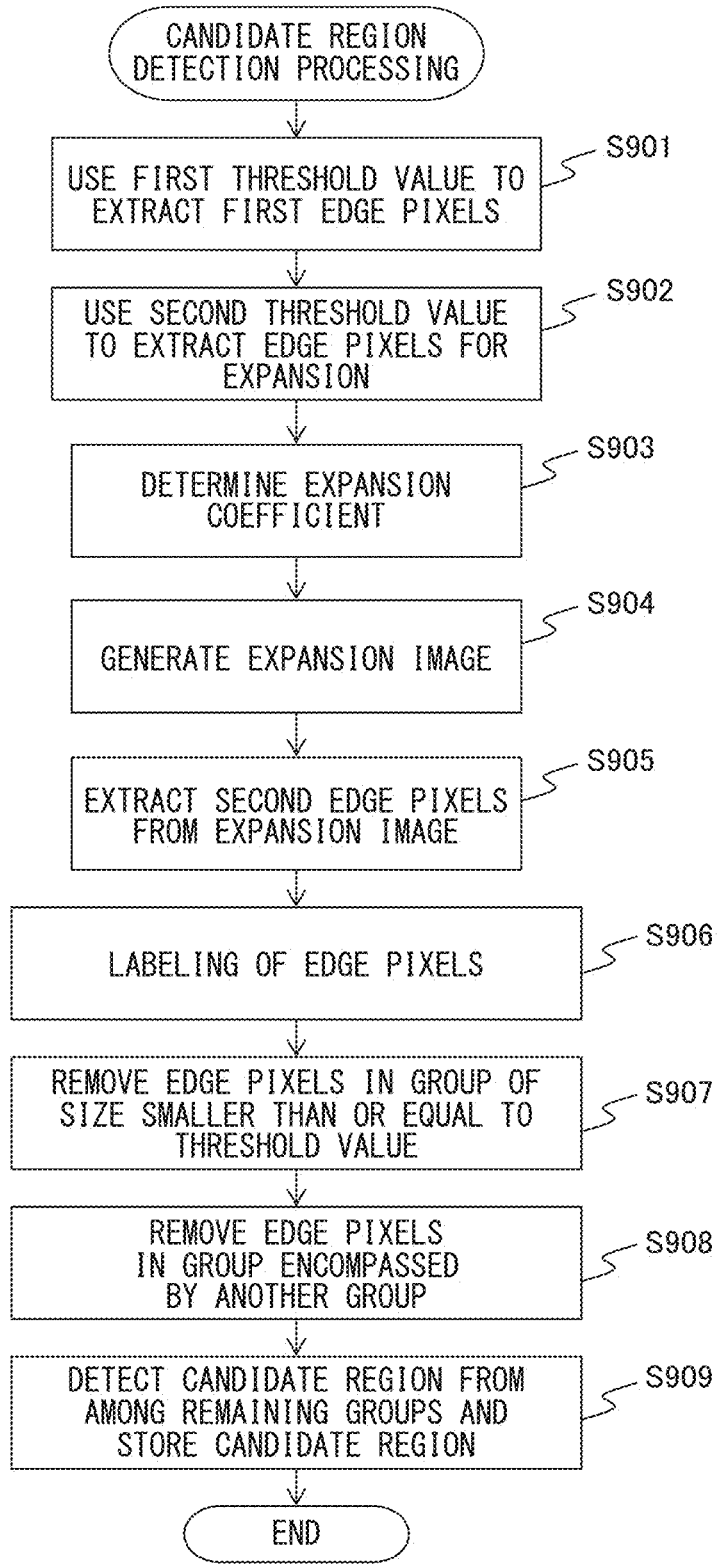
FIG. 22 is a flowchart illustrating another exemplary operation of candidate region detection processing.

FIG. 22 is a flowchart illustrating another exemplary operation of candidate region detection processing. The flowchart is executed in the information processing apparatus 20 instead of the flowchart illustrated in FIG. 10 described previously when the flowchart of FIG. 21 has been executed. In the operation in the flowchart illustrated in FIG. 22, unlike the operation in the flowchart illustrated in FIG. 10, a first edge image is generated from both of first edge pixels and second edge pixels. Processing at steps S906 through S909 of FIG. 22 is the same as the processing at steps S407 through 410 of FIG. 10, and therefore the description of these steps will be omitted and only the processing at steps S901 through S905 will be described below.

First, the first edge pixel extractor 204 uses a first threshold value to extract first edge pixels from a second input image (step S901). Then the edge-pixel-for-expansion extractor 205 uses a second threshold value to extract edge pixels for expansion from the second input image and generates an edge image for expansion that is made up of the extracted edge pixels for expansion (step S902). Then the expansion image generator 206 determines an expansion coefficient based on pixels in a presumed background region (step S903) and generates an expansion image based on the determined expansion coefficient (step S904). Then the second edge pixel extractor 207 extracts second edge pixels from the expansion image and generates, as a first edge image, an image including valid pixels that correspond to the pixels extracted as the first edge pixels and the pixels extracted as the second edge pixels (step S905).

Similarly, the components of the image processing circuit 27 generate a second edge image and a fourth edge image from both of the first edge pixels and the second edge pixels.

As has been described in detail, the information processing apparatus 20 can properly detect edge pixels appearing due to edges of a document while inhibiting detection of edge pixels produced by a background pattern, by operating in accordance with the flowcharts illustrated in FIGS. 21, 9, 22, 12 and 18.

Figure 23:
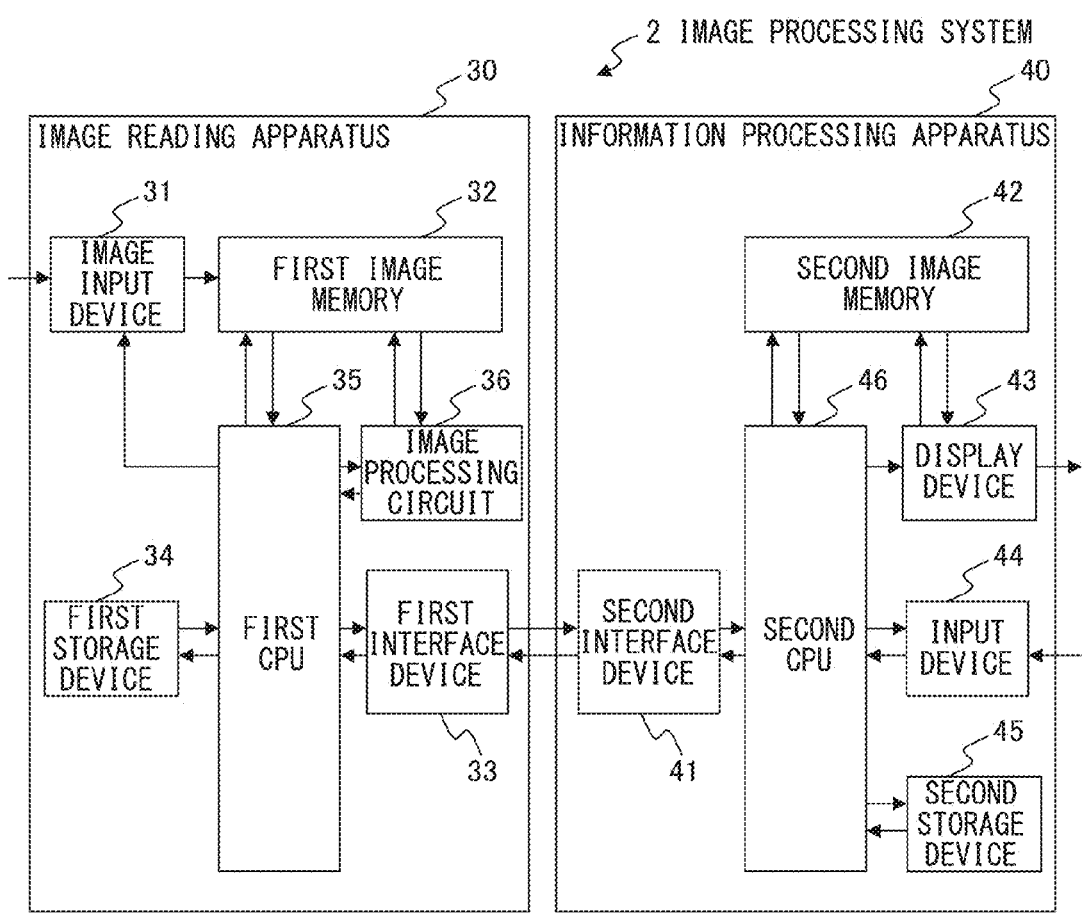
FIG. 23 is a diagram schematically illustrating a configuration of another image processing system 2.

FIG. 23 is a diagram schematically illustrating a configuration of another image processing system 2. The image processing system 2 illustrated in FIG. 23 differs from the image processing system 1 illustrated in FIG. 1 in that a different device includes an image processing circuit. In other words, in the image processing system 2, an image reading apparatus 30, instead of the information processing apparatus 40, includes an image processing circuit 36. The image processing circuit 36 has a function similar to the function of the image processing circuit 27 of the information processing apparatus 20.

In the image processing system 2 illustrated in FIG. 23, processing substantially the same as the processing illustrated in FIGS. 4 and 5 described previously can be executed. How the image reading processing illustrated in the flowchart of FIG. 4 and the document cutting processing illustrated in the flowchart of FIG. 5 are adapted will be described below. In the image processing system 2, processing at step S101 and processing at steps S202 through S212 are executed primarily by a first CPU 35 in cooperation with elements of the image reading apparatus 30 in accordance with a program that has been stored in a first storage device 34 beforehand.

At step S101, an image input device 31 of the image reading apparatus 30 takes an image of imaging subject to generate a read image and stores the read image in a first image memory 32. Since document cutting process is performed in the image reading apparatus 30, transmission and reception of the read image at steps S102 and S201 are omitted.

Processing at steps S202 through S212 is executed by the image processing circuit 36 of the image reading apparatus 30. The operation of the processing is the same as the processing executed by the image processing circuit 27 of the information processing apparatus 20 described in relation to the image processing system 1. The image processing circuit 36 of the image reading apparatus 30 transmits a cut-out region and a separated image to the information processing apparatus 40 through a first interface device 33.

In this way, the mode in which the image reading apparatus 30 includes the image processing circuit 36 and executes the document cutting processing can achieve the same advantageous effects as the mode in which the information processing apparatus includes the image processing circuit to execute document cutting processing.

While preferred embodiments have been described above, it is not limited to the embodiments. For example, sharing of functions between an image reading apparatus and an information processing apparatus is not limited to the examples of the image processing systems illustrated in FIGS. 2 and 23; the components of the image reading apparatus and the information processing apparatus, including the components in the image processing circuit, can be provided any of the image reading apparatus and the information processing device as appropriate. Alternatively, the image reading apparatus and the information processing apparatus may be configured as a single apparatus.

Furthermore, the first interface device 13 and the second interface device 21 in the image processing system 1 may be interconnected through a network such as the Internet, a telephone network (including a mobile network and a fixed-telephone network) or an intranet. In that case, each of the first interface device 13 and the second interface device 21 is equipped with an interface circuit for connecting to the network. Additionally, in that case, a plurality of information processing apparatuses 20 may be distributed on the network and the information processing apparatuses 20 may cooperate with one another to perform the straight line detection processing, the rectangle region detection processing and other processing in a distributed manner, so that image processing services can be provided in the form of cloud computing. This enables the document cutting off processing to be efficiently performed by the image processing system 1 for images read by a plurality of image reading apparatuses 10.

Similarly, the first interface device 33 of the image reading apparatus 30 and a second interface device 41 of the information processing apparatus 40 in the image processing system 2 illustrated in FIG. 23 may be interconnected through a network.

According to the image processing apparatus, the region detection method and the computer-readable, non-transitory medium, it is possible to accurately detect a region in which an image of a document is to be cut out from a read image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   an image input device for imaging a document to generate an input image;
   a presumed background region extractor for extracting a presumed background region presumed to include an image of a background from the input image;
   an expansion image generator for determining an expansion coefficient based on pixels in the presumed background region and generating an expansion image based on the determined expansion coefficient;
   an edge pixel extractor for extracting edge pixels from the expansion image; and
   a document region detector for detecting a document region from the edge pixels.

2. The image processing apparatus according to claim 1, further comprising:
   a threshold value determination module for determining a threshold value based on pixels in the presumed background region; and
   a second edge pixel extractor for using the threshold value to extract second edge pixels from the input image,
   wherein the document region detector detects a document region from the edge pixels or the second edge pixels.

3. The image processing apparatus according to claim 2, wherein the expansion image generator determines the expansion coefficients such that the number of second edge pixels extracted from the expansion image is less than or equal to a predetermined number.

4. The image processing apparatus according to claim 2, further comprising a third edge pixel extractor for using a second threshold value to extract third edge pixels from the input image,
   wherein the expansion image generator expands the third edge pixels based on the expansion coefficient to generate the expansion image.

5. The image processing apparatus according to claim 4, wherein the second threshold value is set at a value lower than the threshold value.

6. The image processing apparatus according to claim 2, further comprising a selector for selecting to use the edge pixels or the second edge pixels for the document region detector to detect the document region.

7. The image processing apparatus according to claim 6, further comprising a rectangle region detector for detecting a rectangle region from the edge pixels,
   wherein the selector selects to use the edge pixels when the rectangle region detector has detected the rectangle region, and selects to use the second edge pixels when the rectangle region detector has detected no rectangle region.

8. The image processing apparatus according to claim 6, wherein the selector selects the edge pixels when the threshold value is greater than or equal to a predetermined value, and selects the second edge pixels when the threshold value is less than the predetermined value.

9. The image processing apparatus according to claim 1, wherein the input image includes a portion of an apparatus that generated the input image, and wherein
   the presumed background region extractor extracts a region close to the portion of the apparatus in the input image, as the presumed background region.

10. The image processing apparatus according to claim 1, wherein the presumed background region extractor determines whether or not a predetermined number of regions among four regions located at four corners of the input image are similar to each other and, when the predetermined number of regions are similar to each other, extracts the similar regions as the presumed background region, the predetermined number being greater than or equal to two.

11. A region detection method for an image processing apparatus which comprises an image input device for imaging a document to generate an input image, the region detection method comprising:

extracting a presumed background region presumed to include an image of a background from the input image;

determining an expansion coefficient based on pixels in the presumed background region and generating an expansion image based on the determined expansion coefficient;

extracting edge pixels from the expansion image; and detecting, using the image processing apparatus, a document region from the edge pixels.

12. A computer-readable, non-transitory medium storing a computer program, wherein the computer program causes an image processing apparatus which comprises an image input device for imaging a document to generate an input image to execute a process, the process comprising:

extracting a presumed background region presumed to include an image of a background from the input image;

determining an expansion coefficient based on pixels in the presumed background region and generating an expansion image based on the determined expansion coefficient;

extracting edge pixels from the expansion image; and detecting a document region from the edge pixels.

\* \* \* \* \*